(12) United States Patent
Geddes et al.

(10) Patent No.: US 7,107,309 B1
(45) Date of Patent: Sep. 12, 2006

(54) METHOD AND SYSTEM FOR PROVIDING INTERSTITIAL NOTICE

(75) Inventors: Martin Geddes, Overland Park, KS (US); David J. Anderson, Seattle, WA (US)

(73) Assignee: Sprint Spectrum L.P., Overland Park, KS (US)

( * ) Notice: Subject to any disclaimer, the term of this patent is extended or adjusted under 35 U.S.C. 154(b) by 821 days.

(21) Appl. No.: 10/190,367

(22) Filed: Jul. 3, 2002

(51) Int. Cl.
   *G06F 15/16* (2006.01)
(52) U.S. Cl. ........................ 709/203; 709/219; 709/224
(58) Field of Classification Search ................ 709/203, 709/217–219, 224
   See application file for complete search history.

(56) References Cited

U.S. PATENT DOCUMENTS

| | | | |
|---|---|---|---|
| 6,321,256 B1 * | 11/2001 | Himmel et al. | 709/218 |
| 6,434,614 B1 * | 8/2002 | Blumenau | 709/224 |
| 6,510,458 B1 * | 1/2003 | Berstis et al. | 709/219 |
| 6,684,249 B1 * | 1/2004 | Frerichs et al. | 709/225 |
| 6,704,773 B1 * | 3/2004 | Cohn et al. | 709/217 |
| 6,874,018 B1 * | 3/2005 | Wu | 709/219 |
| 6,880,123 B1 * | 4/2005 | Landsman et al. | 715/500.1 |
| 6,892,181 B1 * | 5/2005 | Megiddo et al. | 705/14 |
| 6,910,068 B1 * | 6/2005 | Zintel et al. | 709/220 |
| 6,912,571 B1 * | 6/2005 | Serena | 709/224 |
| 2003/0018668 A1 * | 1/2003 | Britton et al. | 707/513 |

OTHER PUBLICATIONS

Network Appliance, "Internet Content Adaptation Protocol (ICAP)," pp. 1-13, Jul. 30, 2001.
IBM, "Intermediaries: An Approach to Manipulating Information Streams," http://www.research.ibm.com/journal/sj/384/barrett.html, IBM Systems Journal, vol. 38, No. 4, 1999.
First USENIX Workshop on Electronic Commerce, Jul. 1995, Payment Switches for Open Networks, http://www.usenix.org/publications/library/proceedings/ec95/gifford.html, printed from the World Wide Web on Apr. 15, 2002.
USENIX, "Payment Switches for Open Networks," Proceedings of the First USENIX Workshop on Electronic Commerce, New York, New York, Jul. 1995, http://www.usenix.org/publications/library/proceedings/ec95/full_papers/gifford.txt, printed from the World Wide Web on Apr. 15, 2002.
Redknee, "Mobile Multimedia Gateway," http://www.redkneww.com/products/rk_pro_net_mobilemultimediagateway.php, printed from the World Wide Web on Apr. 15, 2002.
"Open Pluggable Edge Services (OPES)," http://www.ietf-opes.org/oldindex.html, printed from the World Wide Web on Apr. 15, 2002.
IBM, "Web Intermediaries (WBI)," http://www.almaden.ibm.com/cs/wbi/index.html, printed from the World Wide Web on Apr. 30, 2002.
IBM, "Plugins," http://www.almaden.ibm.com/cs/wbi/Plugins.html, printed from the World Wide Web on Apr. 30, 2002.

(Continued)

*Primary Examiner*—Khanh Dinh
*Assistant Examiner*—Van Kim T. Nguyen

(57) ABSTRACT

A method and system for notifying a user that the user is engaging in interstitial communication. An intermediation system within an HTTP communication path between a content server and a client station engages in interstitial communication with a client station. During the interstitial communication, the intermediation system sends one or more interstitial screens to the client station and includes in each screen a predefined interstitial notice. Further, to help safeguard against the possibility that a third party will try to provide the interstitial notice within an HTTP response to the client station, the intermediation system can be arranged to detect and strip the interstitial notice from any such HTTP response.

15 Claims, 13 Drawing Sheets

OTHER PUBLICATIONS

IBM, "WebPlaces: Adding People to the Web," http://www.almaden.ibm.com/cs/wbi/papers/www8/www.places-abstract.html, printed from the World Wide Web on Apr. 30, 2002.

IBM, "WebSphere Edge Server—Product Overview—IBM Software," http://www-3.ibm.com/software/webservers/edgeserver/, printed from the World Wide Web on Sep. 3, 2002.

Bridgewater Systems, "Content Access Controller," http://www.bridgewatersystems.com/products/content_controller/?BSCID=d8f8772, printed from the World Wide Web on Sep. 3, 2002.

Identifying Web Users in a Proxy Server, U.S. Appl. No. 09/466,104, (Applicants do not have a copy of the cited patent application).

Extracting Contents of a Document During Delivery, U.S. Appl. No. 09/512,974, (Applicants do not have a copy of the cited patent application).

Secure Network Proxying, U.S. Appl. No. 09/512,975, (Applicants do not have a copy of the cited patent application).

Expediting the Retrieval of External Components Referenced in a Document, U.S. Appl. No. 09/512,976, (Applicants do not have a copy of the cited patent application).

Commerical Activity Performed in Conjunction with Document Retrieval, U.S. Appl. No. 09/512,977, (Applicants do not have a copy of the cited patent application).

Modifying Contents of a Document During Delivery, U.S. Appl. No. 09/513,217, (Applicants do not have a copy of the cited patent application).

A. Barbir et al., "An Architecture for Open Pluggable Edge Services (OPES)," Network Working Group, Internet-Draft, Aug. 2, 2002.

A. Barbir et al., "OPES Use Cases and Deployment Scenarios," Network Working Group, Internet-Draft, Aug. 5, 2002.

A. Beck et al., "Requirements for OPES Callout Protocols," Internet-Draft, Aug. 2, 2002.

A. Beck et al., "Example Services for Network Edge Proxies," Internet Draft, Nov. 21, 2000.

\* cited by examiner

1. Article #1
2. Article #2
3. Article #3
4. Article #4

Fig. 11

1. \<A HREF="http://www.newsmagazine.com/article0001.htm"\>Article # 1\</A\>\<BR\>
2. \<A HREF="http://www.newsmagazine.com/article0002.htm"\>Article # 2\</A\>\<BR\>
3. \<A HREF="http://www.newsmagazine.com/article0003.htm"\>Article # 3\</A\>\<BR\>
4. \<A HREF="http://www.newsmagazine.com/article0004.htm"\>Article # 4\</A\>\<BR\>

Fig. 12

| MARKUP-PATTERN | ACTION |
|---|---|
| \<A HREF="http://www.newsmagazine.com/article0001.htm"\> | ADDCOST($2.50) |
| \<A HREF="http://www.newsmagazine.com/article0002.htm"\> | ADDCOST($2.75) |
| \<A HREF="http://www.newsmagazine.com/article0003.htm"\> | ADDCOST($2.50) |
| \<A HREF="http://www.newsmagazine.com/article0004.htm"\> | ADDCOST($3.00) |

Fig. 13

1. <A HREF="http://www.newsmagazine.com/article0001.htm">Article # 1</A> ($2.50)<BR>
2. <A HREF="http://www.newsmagazine.com/article0002.htm">Article # 2</A> ($2.75)<BR>
3. <A HREF="http://www.newsmagazine.com/article0003.htm">Article # 3</A> ($2.50)<BR>
4. <A HREF="http://www.newsmagazine.com/article0004.htm">Article # 4</A> ($3.00)<BR>

Fig. 14

1. Article #1 ($2.50)
2. Article #2 ($2.75)
3. Article #3 ($2.50)
4. Article #4 ($3.00)

| URI-PATTERN | ACTION |
|---|---|
| www.newsmagazine.com/article0001.htm | INTERSTITIAL-BILLING( ) |
| www.newsmagazine.com/article0002.htm | INTERSTITIAL-BILLING( ) |
| www.newsmagazine.com/article0003.htm | INTERSTITIAL-BILLING( ) |
| www.newsmagazine.com/article0004.htm | INTERSTITIAL-BILLING( ) |

Fig. 17

| URI-PATTERN | REQUEST ACTION | RESPONSE ACTION |
|---|---|---|
| www.newsmagazine.com/article0001.htm | INTERSTITIAL-BILLING( ) | ADDCOST($2.50) |
| www.newsmagazine.com/article0002.htm | INTERSTITIAL-BILLING( ) | ADDCOST($2.75) |
| www.newsmagazine.com/article0003.htm | INTERSTITIAL-BILLING( ) | |
| www.newsmagazine.com/article0004.htm | | ADDCOST($3.00) |

| MARKUP-PATTERN | ACTION |
|---|---|
| <!-- <COMBOBOX = "US-STATE" ORDER="ALPHA"> --> | MARKUP-INSERTION( ) |

Fig. 18

```
<HTML>
    Please select your state:
    <!-- <COMBOBOX = "US-STATE" ORDER="ALPHA"> -->
</HTML>
```

Fig. 19

```
<HTML>
    Please select your state:
    <SELECT>
        <OPTION VALUE="Alabama">Alabama
        <OPTION VALUE="Alaska">Alaska
        <OPTION VALUE="Arizona">Arizona
        <OPTION VALUE="Arkansas">Arkansas
        <OPTION VALUE="California">California
        <OPTION VALUE="Colorado">Colorado
        <OPTION VALUE="Connecticut">Connecticut
        * * *
        <OPTION VALUE="Virginia">Virginia
        <OPTION VALUE="Washington">Washington
        <OPTION VALUE="West Virginia">West Virginia
        <OPTION VALUE="Wisconsin">Wisconsin
        <OPTION VALUE="Wyoming">Wyoming
    </SELECT>
</HTML>
```

Fig. 20

METHOD AND SYSTEM FOR PROVIDING INTERSTITIAL NOTICE

BACKGROUND

1. Field of the Invention

The present invention relates to network communications and more particularly to mechanisms for managing and controlling the delivery of web content (e.g., web pages, objects, files, applications, etc.)

2. Description of Related Art

In recent years, the Internet and the world wide web have become ubiquitous. The sheer volume of information and services available at any time via the Internet is astounding. As such, users often turn to the Internet to communicate with others, to receive current news reports, to shop, to be entertained, and for assorted other reasons.

As its name implies, the Internet is a network of computer networks. The world wide web is, in turn, an application that runs on the Internet, powered by web servers and web browsers. A web server stores or has access to "web pages" made up of various objects (e.g., text, graphics, audio, video or other media and logic) and can send the pages to web browsers that access the server via hypertext transfer protocol (HTTP) or another agreed protocol.

A web page is usually defined by a set of markup language, such as hypertext markup language (HTML), wireless markup language (WML), handheld device markup language (HTML), extensible hypertext markup language (XHTML) or compact HTML (cHTML) for instance. The markup language typically specifies text to be displayed and includes tags that direct the browser to carry out various functions. For instance, a tag can direct the browser to display text in a particular manner. Or a tag can direct the browser to request and load other objects, such as images or sound files, to be presented as part of the web page. Or as another example, a tag can direct the browser to display a hyperlink that points to another web page or object (or generally referencing any other web content).

(Note that markup language could take other forms as well. As one other example, for instance, a markup language such as voice extensible markup language (VXML) could include voice-tags that direct a browser to play out speech messages to a user. In that event, the client station might be a voice command platform with which a user communicates via a telephone link. Still other examples are also possible.)

A user operating a web browser on a client station can direct the web browser to navigate to a particular web page or to load other web content. To do so, the user may select or enter into the browser a universal resource identifier (URI), typically a universal resource locator (URL), which points to a host web server, usually by a domain name, and identifies the requested content, usually by a path and filename. In response, the browser will then generate and send to the web server an HTTP "GET" request message, which indicates the URI. When the server receives the GET request, if the requested content is available, the server will then respond by sending to the browser an HTTP "200 OK" response message that includes the requested content. And when the browser receives the HTTP response, the browser will then present the content to the user.

As is well known, Internet communications occur through a defined set of protocol layers, including an application layer, a transport layer, a network layer and a physical layer. Applications, such as a web browser and a web server, communicate with each other according to an application layer protocol, such as HTTP. And those communications are then arranged as data packets, which are passed between the applications according to a transport layer protocol such as TCP and between network nodes according to the network layer IP protocol. Each packet typically bears a TCP/IP header, which indicates source and destination IP addresses as well as source and destination TCP ports associated with the respective applications.

In order for a web client to engage in HTTP communication with a web server, the client and server will first establish a TCP "socket" or "connection" between each other. The client then sends an HTTP GET request in the TCP socket, typically through one or more routers, switches and/or proxies, to the IP address of the server. And the server responds by sending a 200 OK response in the TCP socket to the IP address of the client.

Alternatively, the web client may open up a first TCP socket with a designated proxy server, an the proxy may open up a second TCP socket with the web server. The web client may then send an HTTP GET request in the first TCP socket to the proxy, and the proxy may then send the HTTP GET request in the second TCP socket to the IP address of the web server. In turn, the web server may send a 200 OK response in the second TCP socket to the proxy, and the proxy may then send the 200 K response in the first TCP socket to the IP address of the web client.

SUMMARY

An exemplary embodiment of the present invention is directed to a method and system for providing interstitial notice. The interstitial notice can function as a trust-indication, advising a user that the user is communicating with a trusted intermediary.

In one respect, for instance, the exemplary embodiment may take the form of a method that involves, within an intermediation system located in an HTTP communication path between a content server and a client station, (i) engaging in interstitial communication with the client station, (ii) during interstitial communication, sending to the client station one or more interstitial screens, each including a predefined interstitial notice, (iii) detecting the predefined interstitial notice in an HTTP response message received by the intermediation system, (iv) stripping the predefined interstitial notice from the HTTP response so as to establish a modified HTTP response, and (v) sending the modified HTTP response along the HTTP communication path to the client station.

And in another respect, for instance, the exemplary embodiment may take the form of an intermediation system that is located within an HTTP communication path between a client station and a content server. The intermediation system may include interstitial-communication logic for engaging in interstitial communication with the client station, and the interstitial communication logic could send to the client station one or more interstitial screens, each including a predefined interstitial notice. Further, the intermediation system may include notice-management logic for detecting the predefined interstitial notice in an HTTP response message received by the intermediation system and for stripping the predefined interstitial notice from the HTTP response message before sending the HTTP response message along to the client station.

These as well as other aspects and advantages will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which:

FIG. 11 is an exemplary illustration of hyperlinks that may be set forth in a web page displayed at a client station;

FIG. 12 is a source code listing, depicting markup language that may underlie the hyperlinks shown in FIG. 11;

FIG. 13 is a partial illustration of a markup-pattern table, depicting records that an exemplary intermediation system may reference in order to trigger addition of cost information to web content;

FIG. 14 is a source code listing, depicting the markup language of FIG. 12, modified to produce an explanation of cost next to each hyperlink;

FIG. 15 is an exemplary illustration of hyperlinks embellished with cost information pursuant to the exemplary embodiment;

FIG. 16 is a partial illustration of a URI-pattern table, depicting records that an exemplary intermediation system might reference in order to trigger interstitial billing;

FIG. 17 is a partial illustration of a URI-pattern table, depicting records that an exemplary intermediation system may reference to trigger interstitial billing during an HTTP request and to trigger embellishment with cost information during an HTTP response;

FIG. 18 is a partial illustration of a markup-pattern table, depicting a record that an exemplary intermediation system might reference in order to trigger insertion of markup language in an HTTP response;

FIG. 19 is a source code listing, depicting markup language that includes markup-insertion language in accordance with an exemplary embodiment; and FIG. 20 is a source code listing, depicting the markup language of FIG. 19, modified to insert a custom object in place of the markup-insertion language.

DETAILED DESCRIPTION OF EXEMPLARY EMBODIMENT

1. Exemplary Base Network Architecture

As a general matter, an exemplary embodiment of the present invention provides an intermediation system for network communications, and more particularly for web communications. The intermediation system preferably sits within an HTTP communication path between a client station and a content server, so that it can detect and act on HTTP communications that pass between the client and the server.

The HTTP communication path between the client station and the content server can take various forms. Generally speaking, it is the path along which a request for web content passes from the client station to the content server and along which a response to the request passes from the content server to the client station. (Alternatively, separate HTTP communication paths could exist for the request and response.)

In this regard, a request for web content could be carried by a single HTTP request messages that is sent from the client station to the content server. Or the request for web content could be carried in multiple HTTP request messages, such as one that is sent from the client station to an intermediate point (e.g. proxy, portal, etc.) and another that is then sent from the intermediate point to the content server, for instance. Similarly, the requested web content could then be carried in an HTTP response message that is sent from the content server to the client station. Or the content could be carried in multiple HTTP response messages, such as one that is sent from the content serve to an intermediate point and another that is then sent from the intermediate point to the client station, for instance. Additional steps could exist as well.

Figure 1:
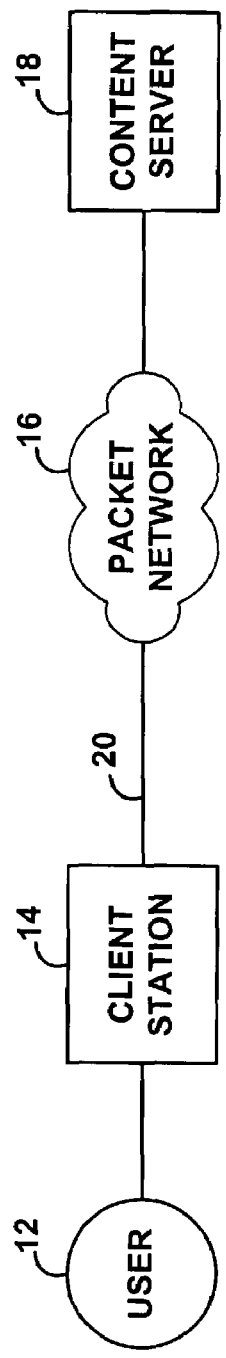
FIG. 1 is a block diagram showing an exemplary HTTP communication path between a client station and content server.

Referring to the drawings, FIG. 1 depicts an exemplary HTTP communication path between a client station 14 and a content server 18. It should be understood, however, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, as in most telecommunications applications, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware, firmware and/or software logic. For instance, various functions may be carried out by a processor executing a set of machine language instructions stored in memory. Provided with the present disclosure, those skilled in the art can readily prepare appropriate computer instructions to perform such functions.

As shown in FIG. 1, client station 14 and content server 18 are linked together by a packet-switched network (or generally "data network") 16. More particularly, client station 14 communicates on an access channel 20, which provides the client station with connectivity to the packet-switched network 16. (I.e., the client station is communicatively linked via the access channel to the packet-switched network.) And content server 18 sits on the packet-switched network 16 or is otherwise accessible via the packet-switched network. (I.e., the content server is communicatively linked with the packet-switched network.) Thus, HTTP communications between client station 14 and content server 18 pass over a communication path that includes access channel 20 and packet-switched network 16. (Note that the access channel itself can comprise one or more links, whether circuit-switched and/or packet-switched.)

In this general arrangement, a browser running on client station 14 may generate an HTTP GET request, seeking web content from content server 18. The client station may then open a TCP socket with content server 18 and send the GET request through access channel 20 and packet-switched network 16 to the IP address of content server 18. Upon receipt of the request, the content server 16 may then generate an HTTP 200 OK response that carries markup language defining the requested content. And the content server may send the 200 OK response through packet-switched network 16 and access channel 20 to the IP address of the client station 14. Ultimately upon receipt of the response, the client station 14 may then present the content to a user 12.

Figure 2:
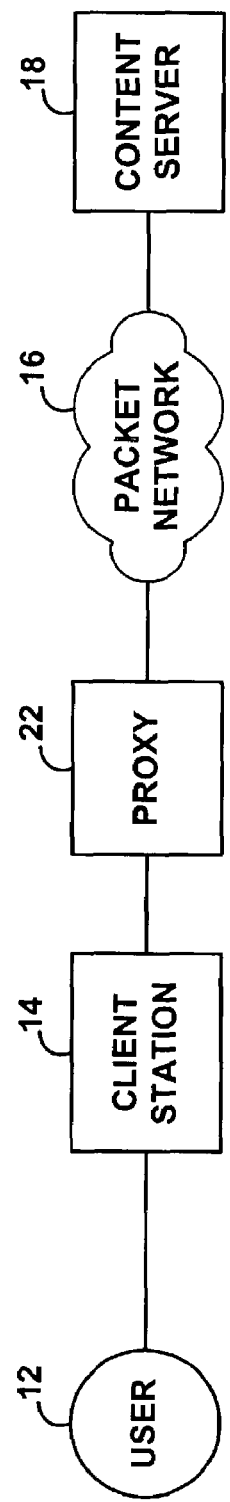
FIG. 2 is a block diagram showing an exemplary HTTP communication path that includes a proxy.

Referring next to FIG. 2, a variation on the arrangement of FIG. 1 is shown. In FIG. 2, a proxy server 22 is added within the HTTP communication path between the client station 14 and the content server 18. In the figure, the proxy sever 22 is located within the access channel 20 between the client station 14 and the packet-switched network 16. However, the proxy server 22 could instead reside elsewhere in the HTTP communication path, such as elsewhere on packet-switched network 16 for instance. Further, multiple proxy servers could be provided.

In the arrangement of FIG. 2, a request for web content still passes along the HTTP communication path from the client station 14 to the content server 18. However, in this arrangement, separate TCP sockets may exist between the client station 14 and proxy server 22 on one hand and the proxy server 22 and content server 18 on the other hand. Thus, the communication path carries a request for web content in an HTTP GET request from the client station 14 to the proxy server 22 and then in another HTTP GET request from the proxy server 22 to the content server 18. And the communication path carries the requested web content in an HTTP 200 OK response from the content server 18 to the proxy server 22 and then in another HTTP 200 OK response from the proxy server to the client station.

Alternatively, proxy server 22 may be a transparent proxy, which does not itself establish TCP sockets with the two endpoints but instead just forwards HTTP messages to their destinations. Thus, for instance, if the client station 14 opens a TCP socket with the content server 18, the client station 14 may send an HTTP GET request to the content server 18, via the proxy server 22. And the content server 18 may send an HTTP 200 OK response to the client station 14, via the proxy server 22.

Figure 3:
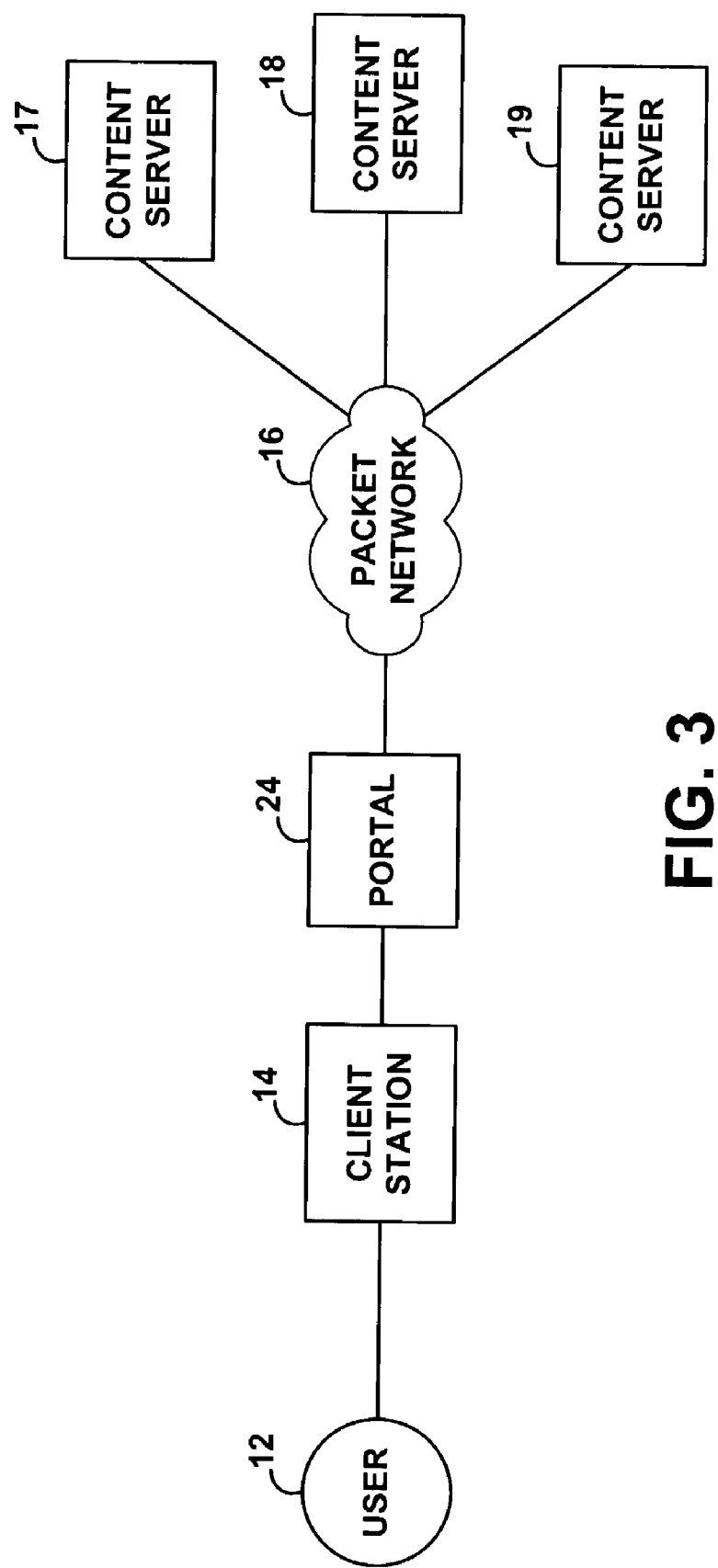
FIG. 3 is a block diagram showing an exemplary HTTP communication path that includes a web portal.

Referring next to FIG. 3, another variation on the arrangement of FIG. 1 is shown. In FIG. 3, a web portal 24 has been added within the HTTP communication path between the client station 14 and the content server 18. Like proxy server 22 in FIG. 2, this portal 24 is shown in the access channel 20 between the client station 14 and the packet-switched network 16. But the portal 24 could reside elsewhere in the HTTP communication path.

As is well known, a web portal is effectively a web server itself, although it may get its web content from one or more content servers, typically aggregating or visually integrating the content together in respective frames or other "portlets" (e.g., as components of a single web page). For this reason, FIG. 3 illustrates multiple content servers 17, 18, 19 on packet-switched network 16.

In the arrangement of FIG. 3, a request for web content again still passes along the HTTP communication path between the client station 14 and content server 18. However, in usual practice, the request passes as an HTTP GET request from the client station to an IP address of the web portal 24, rather than to an IP address of the content server 18. Upon receipt of the request, the portal 24 may then establish a TCP socket respectively with each of the content servers 17, 18, 19 (or at least with one of them) and send to each content server an HTTP GET request seeking web content for a particular portlet. Each of the content severs 17, 18, 19 may then send a 200 OK response message to the portal 24, providing a respective subset of web content. And the portal 24 may then aggregate the subsets of web content together to form a single set of web content. The portal may then send a 200 OK response to the client station 14, providing the aggregated web content, i.e., the content from each of the underlying content servers 17, 18, 19.

Alternatively, it is possible that portal 24 may have already cached (stored) certain web content that the portal will use in various portlets. In that event (assuming the content has not expired), the portal 24 would not need to request the content from a content server in response to a GET request from the client station 14. But the effect is as thought the portal does so, since the portal provides the client station with web content from a content server, in response to a GET request from the client station.

Thus, in that instance, an HTTP communication path may still be said to extend between the client station 14 and the content serer 18, since a request for web content (by or on behalf of the client station 14) is sent to the content server 18, and web content is then transmitted from the content server 18 for ultimate receipt and presentation by the client station 14.

It should be understood that the arrangements shown in FIGS. 1–3 are representative of many possible communication systems, including many possible HTTP communication paths between a client station and a content server. In this regard, for instance, two of the variables in the system are the client station 14 and the access channel 20, each of which can take a variety of forms.

Figure 4:
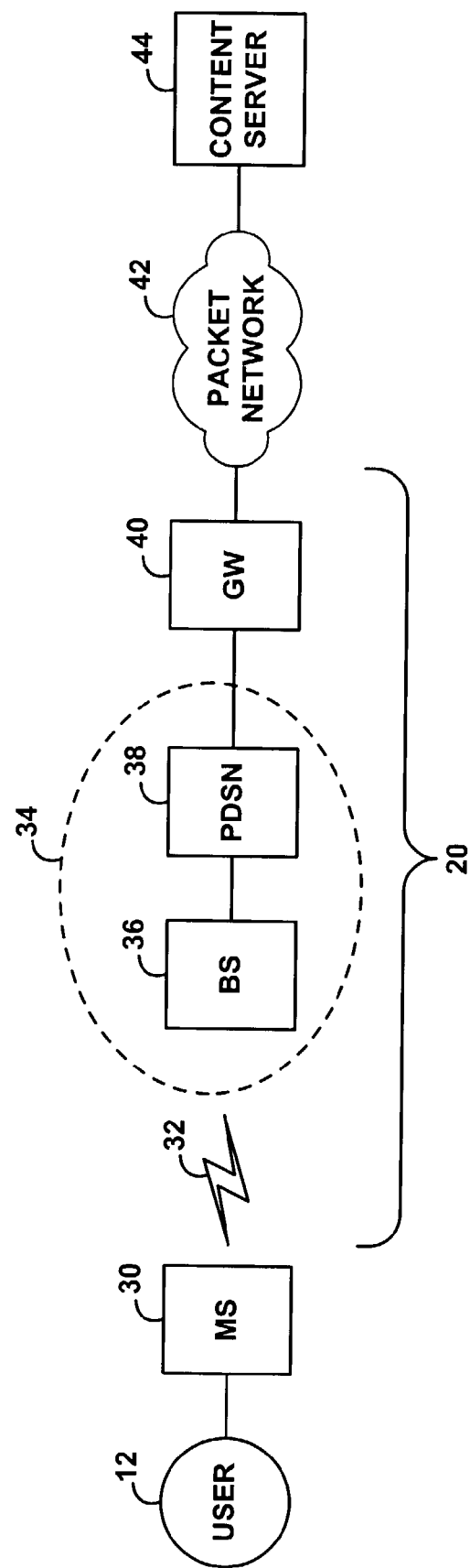
FIG. 4 is a block diagram showing an HTTP communication in a wireless communication system.
Figure 5:
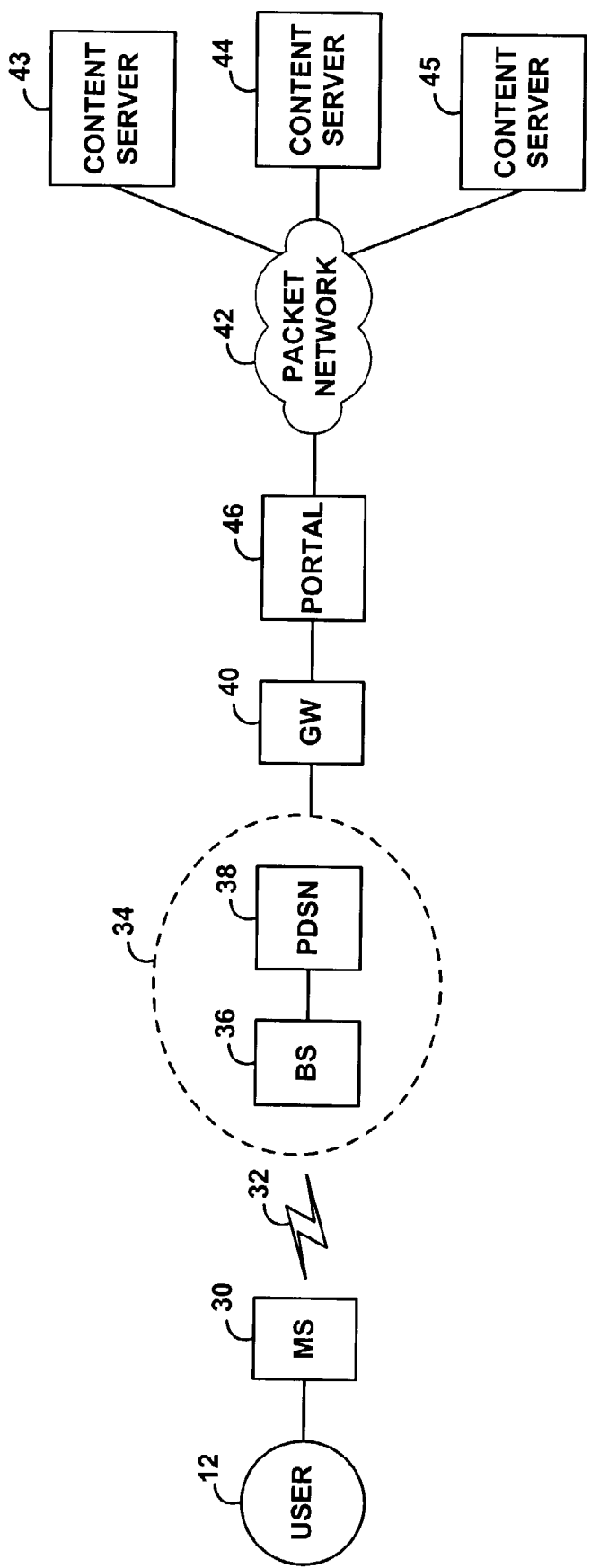
FIG. 5 is a block diagram showing an HTTP communication path in a wireless communication system, including a portal within an access channel.
Figure 6:
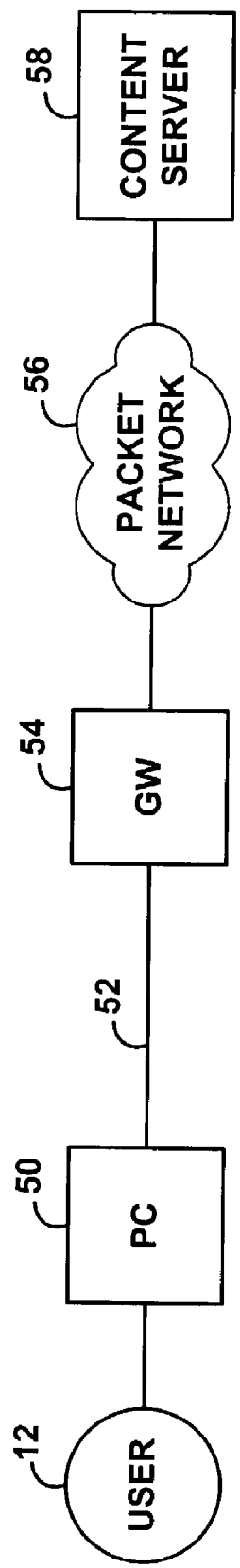
FIG. 6 is a block diagram showing an HTTP communication path in a landline communication system.

As one example, for instance, the client station 14 could be a landline personal computer, and the access channel 20 could include a local area network. And as another example, the client station could be a wireless terminal such as a 3G mobile station, and the access channel could then comprise a radio access network. (Note that the term "mobile station" generally refers to a wireless terminal. Notwithstanding the term "mobile," it is possible that a "mobile station" could be either a fixed wireless terminal or a mobile wireless terminal.) FIGS. 4–6 depict some more specific arrangements to help further illustrate these possible HTTP communication paths.

Referring to FIG. 4, an example wireless communication system is shown. In this example, the client station is a 3G mobile station 30, which communicates over an air interface 32 with a radio access network 34. (The radio access network 34 is shown to include a base station 36, which controls air interface communications with the mobile station, and a packet data serving node (PDSN) 38, which provides packet-switched network connectivity. But the radio access network could take other forms instead.) Radio access network 34 is then coupled via a gateway 40 to a packet-switched network 42. And a content server 44 sits on the packet-switched network.

In this arrangement, the access channel 20 between the client station 14 and the packet-switched network 42 includes the air interface 32, the radio access network 34, and the gateway 40. In this regard, the air interface might carry wireless communications in compliance with any radio communication protocol, such as CDMA, TDMA, GSM/GPRS, EDGE, UMTS, 802.11 (e.g., 802.11a/b), or Bluetooth, for instance. This description will consider CDMA by way of example.

According to existing 3G CDMA protocols, the mobile station 30 and PDSN 38 can establish a point-to-point protocol (PPP) data link, over which packet data can pass between the mobile station 30 and the packet-switched network 42. Further, the mobile station may have an assigned IP address and may communicate through a mobile-IP home agent (not shown), to facilitate mobility.

An exemplary 3G mobile station may be a handheld device such as a cellular or PCS telephone or personal digital assistant (e.g., Palm or Pocket-PC type device) for instance. As such, the mobile station will likely have a relatively small display screen. Additionally, because the display screen will likely be too small to display full size HTML pages, the mobile station will likely be equipped with a "microbrowser," which is a web browser tailored to present web content on a smaller handset display. An exemplary microbrowser is the Openwave™ Mobile Browser available from Openwave Systems Inc., which can be arranged to provide mobile information access through compliance with the industry standard Wireless Application Protocol (WAP) as well as various markup languages such as HDML, WML, XHTML, and cHTML.

If the mobile station 30 is a handheld device running a microbrowser, gateway 40 might function as a WAP gateway, to transcode web content being sent from content server 44 to mobile station 30, so as to put the web content and HTTP signaling into a form suitable for reference by the microbrowser (if not already). Alternatively gateway 40 could function merely as a proxy, particularly where web content being sent to the mobile station is already in a form suitable for interpretation and presentation by the microbrowser.

Additionally, gateway 40 can function to inject into an HTTP request from mobile station 30 a user ID that can be used by downstream entities (such as content server 44, for instance) to provide user-specific functionality. In this regard, gateway 40 could maintain or otherwise have access to information that correlates user ID to session ID, so that the gateway can determine what user ID to insert for an HTTP communication from a given mobile station 30 (user 12).

Alternatively, the mobile station 30 could be a more full scale computing platform, such as a desktop or notebook personal computer, equipped with a wireless communication interface to facilitate communication over air interface 32 and through radio access network 34. (For instance, the personal computer could be linked (wirelessly or through a pin-out port or other connection) to a 3G handheld device, or the personal computer could include a plug-in card (e.g., PCI card or PCMCIA such as the AirCard® available from Sierra Wireless, Inc.) that provides for wireless communication.) In that event, the mobile station might have a more full scale web browser such as Microsoft Internet Explorer® or Netscape Navigator® for instance, which can conventionally receive and interpret HTML web content.

In the arrangement shown in FIG. 4, an HTTP communication path exists between mobile station 30 and content server 44. Thus, mobile station 30 may send an HTTP request (or equivalent request) for web content to content server 44, and content server 44 may respond by sending the requested web content to the mobile station 30. Mobile station 30 may then present the content to a user 12.

In an alternative arrangement, note that gateway 40 could sit on a core packet network (not shown) that resides between the radio access network 34 and the packet network 42. The core packet network could be a private IP network operated by the wireless carrier. And packet network 42 may then be a public packet network such as the Internet. (Alternatively, the networks could take other forms.) In that event, it is also possible that content server 44 might reside on the core packet network rather than on the public packet network 42.

Referring next to FIG. 5, a variation on the arrangement of FIG. 4 is now shown. Similar to FIG. 3, this figure introduces a web portal in the access channel between the client station (mobile station 30) and the packet-switched network. Additionally, this figure shows several content servers 43, 44, 45 on the packet-switched network 42. Thus, similarly, an HTTP communication path still exists between the mobile station 30 and content server 44. However, the mobile station may send a request for web content to the portal 46, instead of to a content server. And the portal may then aggregate content from the one or more content servers 43, 44, 45, and provide the aggregated content to the mobile station in an HTTP response.

In this arrangement, the web portal 46 functions as described above, to aggregate web content in various portlet containers of a single web page. In this regard, if the mobile station 30 is a handheld device with a small display screen, it is possible that only one (or part of one) portlet will appear on the display screen of the mobile station at a time. (According to the HDML markup protocol, for instance, the portlets might be provided as separate "cards" (akin to pages), and a group of cards could be sent to the mobile station as a deck. Other arrangements are also possible.) In that case, a user of the mobile station may have to navigate from portlet to portlet. Alternatively, the user may be able to view the entire portal page at once, possibly by scrolling horizontally and vertically through the page.

Referring next to FIG. 6, another example communication system is shown, in this case a landline communication system. By way of example, the client station in the landline communication system is shown to be a personal computer (PC) 50, which communicates over a landline link 52 with a gateway 54 to a packet-switched network 56. A content server 58 then sits on the packet-switched network 56.

In this arrangement, the landline link 52 and gateway could take various forms. For example, link 52 could be a local area network (LAN), and gateway 54 could be a LAN server that is coupled to a backbone of packet-switched network 56. And as another example, link 52 could be a dial-up connection over the public switched telephone network (PSTN), and gateway 54 could be a network access server (NAS) that provides connectivity with the packet-switched network 56. Suitable network access server are the Total Control network access server, available from CommWorks Corporation, and the Shasta Broadband Service Node, available from Nortel Networks. Such servers could be implemented to function as internet service provider (ISP) modem banks in a manner well known in the art.

As in the arrangements described above, an HTTP communication path can exist in this arrangement between the client station 50 and the content server 58. The HTTP communication path in this arrangement includes the landline link 52, the gateway 54 and the packet-switched network 56. Thus, a web browser running on personal computer 50 could generate and send to content server 58 an HTTP request seeking designated web content, and content server 58 could return an HTTP response providing the requested content. The web browser on personal computer 50 could then present the content to a user 12.

Although not illustrated, many variations on this landline arrangement are possible as well. For instance, just as in the general arrangement depicted in FIG. 3 and in the wireless arrangement depicted in FIG. 5, a web portal could sit within the HTTP communication path between the client station (personal computer 50) and one or more content servers. And the user 12 of the personal computer 50 could then navigate to the portal web page so as to load web content aggregated from multiple content servers.

More generally, it should be understood that many variations on the arrangements shown in FIGS. 1–6 are possible, and an HTTP communication path can take various forms. Requests for web content can pass over a variety of different paths between a client station and a content server. And the requested web content can then pass over a variety of different paths between the content server to the client station.

2. Overview of Exemplary Intermediation System a. Placement of Intermediation System Within HTTP Communication Path As noted above, an exemplary intermediation system will sit within the HTTP communication path between a client station and content server. In this regard, the intermediation system will preferably include trigger logic, which detects HTTP communications, and a enforcement logic, which acts on or in response to HTTP communications. In the exemplary embodiment, the intermediation system will be considered to sit within the HTTP communication path, as long as at least its trigger logic sits within the HTTP communication path. Some or all of the enforcement logic could then also lie within the HTTP communication path or could lie elsewhere and can be invoked as appropriate to carry out various intermediation functions.

Figure 7:
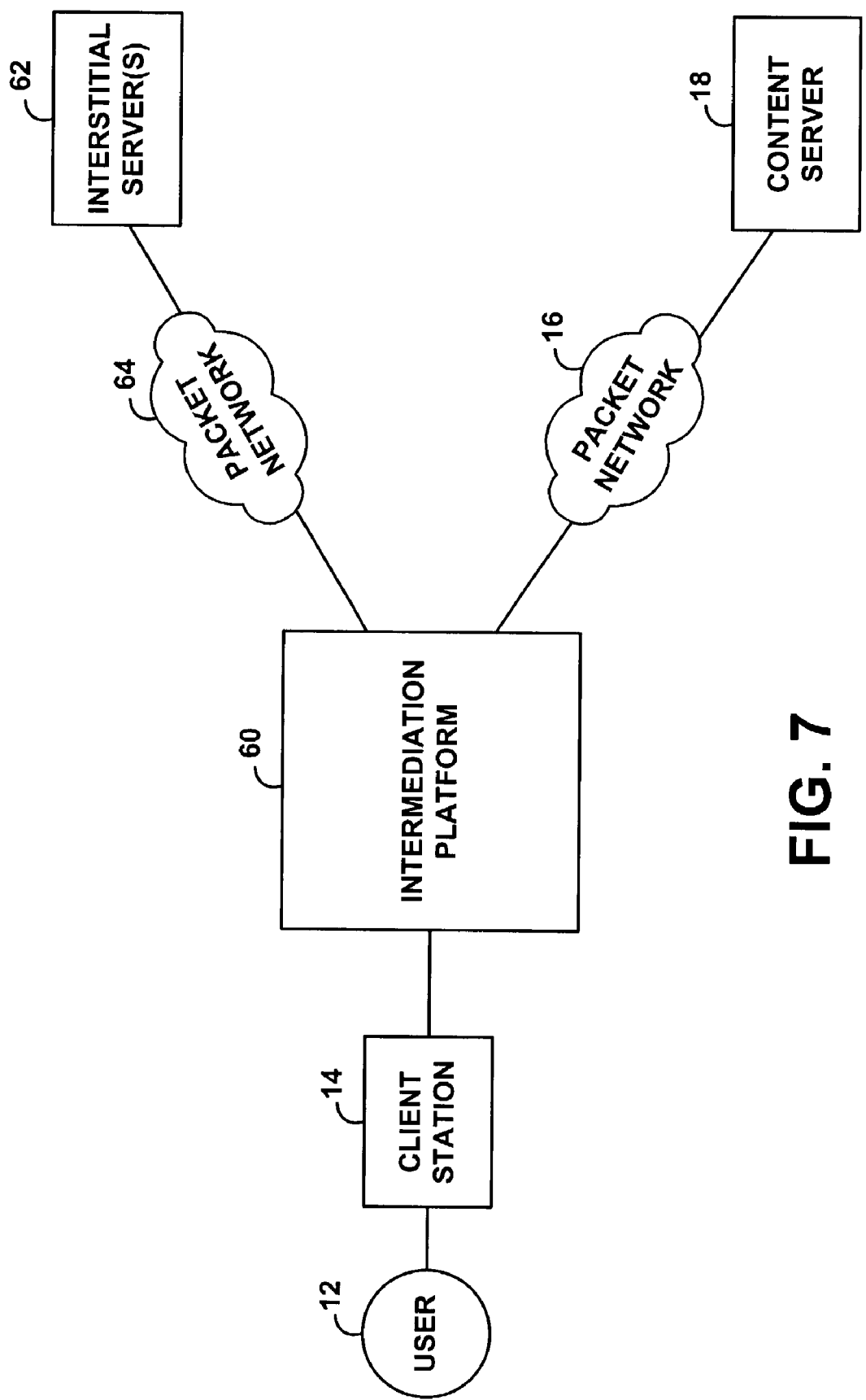
FIG. 7 is a block diagram showing placement of an intermediation system within an HTTP communication path, in accordance with the exemplary embodiment.

Referring now to FIG. 7, a variation of FIG. 1 is shown, to help illustrate the arrangement of an exemplary intermediation system. In FIG. 7, as in FIG. 1, a client station 14 communicates with a content server 18 over a packet-switched network 16, so that an HTTP communication path exists between the client station 14 and the content server 18.

As further shown, an intermediation platform 60 has then been inserted within that HTTP communication path. In particular, the intermediation platform 60 has been inserted within the access channel 20 between the client station 14 and the packet-switched network 16. As a result, HTTP communications (e.g., requests for web content, and responses providing web content) will necessarily pass through the intermediation platform 60 on their way between the client station 14 and the content server 18. With this arrangement, the owner or operator of the access channel 20 can advantageously intermediate in HTTP communications to and from users of the access channel.

Alternatively, however, the intermediation platform could reside elsewhere in the HTTP communication path. If not in the access channel 20, a mechanism will preferably be provided to direct HTTP communications through the intermediation platform.

In accordance with the exemplary embodiment, the intermediation platform 60 embodies intermediation trigger logic, so as to detect HTTP communications flowing between the client station 16 and the content server 18. In addition, the intermediation platform 60 may also include some or all of the intermediation enforcement logic. However, in the exemplary embodiment, the intermediation platform 60 preferably includes only a small set of enforcement logic, and the bulk of the enforcement logic is instead located at one or more central servers.

In the arrangement of FIG. 7, the one or more central servers are shown as "interstitial" servers 62, labeled as such because the servers can be employed in the middle of an intermediation process, i.e., during an HTTP communication. By way of example, the interstitial servers 62 are shown linked with intermediation platform 60 by at least a packet-switched network 64. Packet-switched network 64 may or may not be the same network as packet-switched network 16. Thus, it is possible that interstitial servers 62 might sit on the same network where content server 18 sits. In the exemplary embodiment, however, packet-switched network 64 is preferably a private or core packet-switched network operated by the carrier that supplies client station 14 with access to packet-switched network 16, i.e., the owner or operator of access channel 20.

Generally speaking, the interstitial servers 62 may carry out various intermediation enforcement functions, possibly through interaction with user 12 of client station 14. By way of example, an interstitial server might function to collect user payment for requested web content. And as another example, an interstitial server might function to obtain user approval for release of confidential user information, such as user location or user passwords for instance. Other examples are possible as well.

Figure 8:
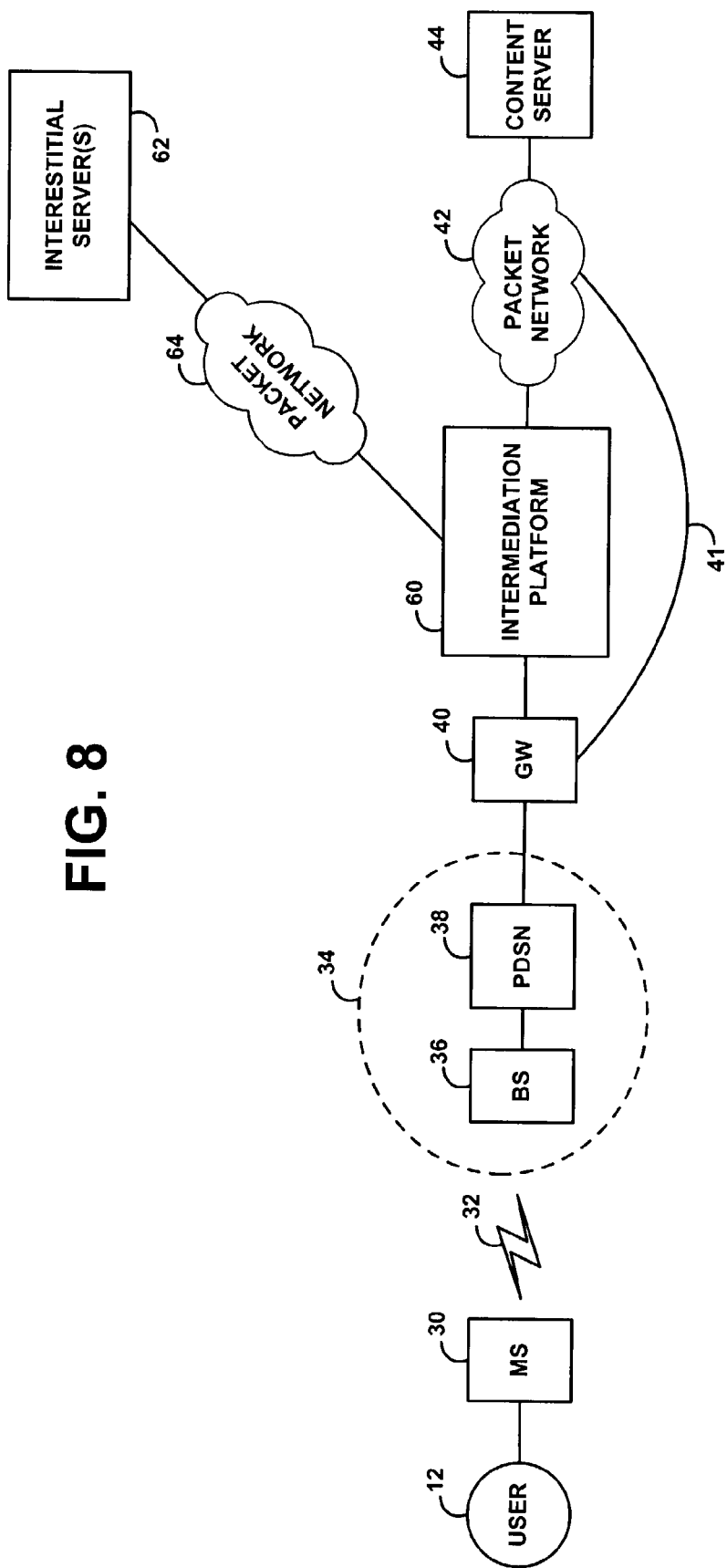
FIG. 8 is a block diagram showing placement of an intermediation system within an HTTP path through a wireless communication system, in accordance with the exemplary embodiment.
Figure 9:
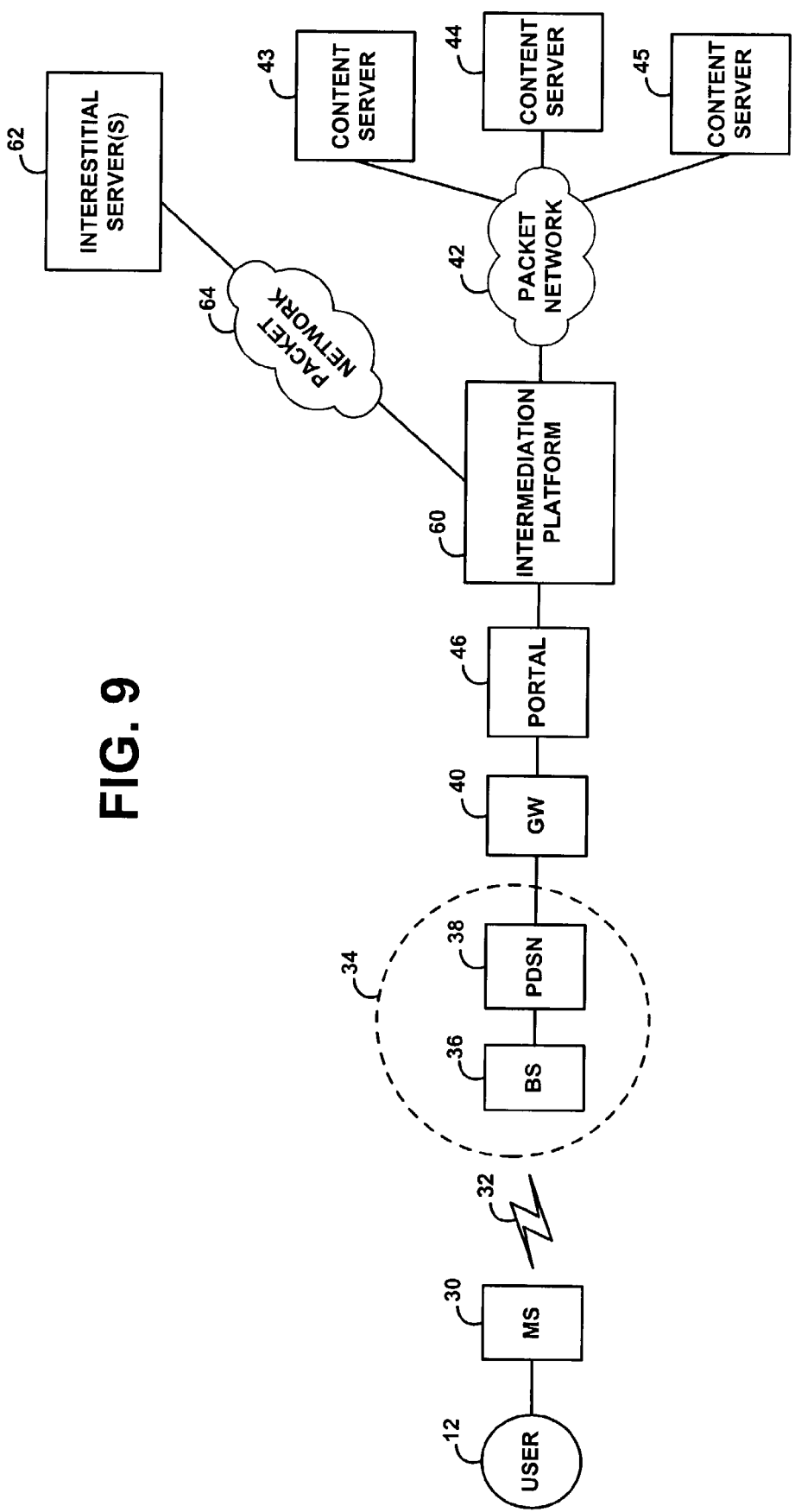
FIG. 9 is a block diagram showing placement of an intermediation system within an HTTP path through a wireless communication system, including a web portal within the HTTP communication path, in accordance with the exemplary embodiment.

The arrangement shown in FIG. 7 is generally representative of how an intermediation system can be inserted within an HTTP communication path between a client station and a content server. Referring next to FIGS. 8 and 9, some more specific arrangements are shown, in this case to illustrate one or many ways that the intermediation system could be implemented within a wireless communication system such as those shown in FIGS. 4 and 5 for instance. Similar arrangements could also be established in other systems, whether landline or wireless.

FIG. 8 is a variation on the more specific arrangement of FIG. 4. In FIG. 8, as in FIG. 4, the client station is a mobile station 30 that communicates over an air interface 32 and a radio access network 34, the content server 44 sits on a packet-switched network 42, and a gateway 40 sits between the radio access network 34 and the packet-switched network 42.

In FIG. 8, the intermediation platform 60 has then been inserted between the gateway 40 and the packet-switched network 42, so that the intermediation platform 60 sits within the HTTP communication path between the mobile station 30 and the content server 44. (Although gateway 40 may also have a more direct connection 41 to the packet-switched network 42.) Additionally, the intermediation platform 60 is then shown linked with a core packet network 64, which may be owned and operated by the wireless carrier. And interstitial servers 62 are shown as nodes on the core packet network 64.

As one of many example variations from this arrangement, note that gateway 40 and intermediation platform 60 could themselves sit on core packet network 64. In that arrangement, the radio access network (and particularly PDSN 38) could be arranged to route outgoing traffic to gateway 40, and gateway 40 could in turn be arranged to route the traffic to the intermediation platform 60. The intermediation platform can then be arranged to route the traffic along its way, and/or to invoke or carry out an intermediation function. Similarly, incoming traffic can flow from the packet-switched network 42 to the intermediation platform 60, to the gateway 40 and to the radio access network, for transmission to the mobile station 30. Thus, with this variation, the intermediation platform would still sit within the HTTP communication path between the mobile station 30 and the content server 44.

Further, note that some of the functions of intermediation platform 60 and gateway 40 could be combined together on a common platform or could be allocated to the platform 60 and gateway 40 in various ways. For instance, the intermediation platform could perform some functions that would otherwise be performed by the gateway. And the gateway could perform some functions that would otherwise be performed by the intermediation platform.

(Still further, note that under normal circumstances, gateway 40 might cache premium web content to facilitate quicker delivery of the content to client stations such as mobile station 30. In the exemplary embodiment, gateway would be arranged to not do so. (Otherwise, HTTP requests for such content would normally not pass to the intermediation platform). For instance, when the intermediation platform 60 passes web content via gateway 40 to the client station, the intermediation platform could instruct the gateway to not cache the content.)

FIG. 9, in turn, is a variation on the arrangement shown in FIG. 5. In FIG. 9, as in FIG. 5, a web portal 46 has been added between the gateway 40 and the packet-switched network 42 on which the content server 44 sits. In FIG. 9, the intermediation platform 60 has then been inserted between the gateway 40 and the packet-switched network 42, so the intermediation platform 60 sits within the HTTP communication path between the mobile station 30 and the content server 44. (That is, a request for web content, passed from the mobile station 30 to the portal 46 and from the portal 46 to the content server 44, will pass through the intermediation platform 60 on its way from the portal 46 to the content server 44. And requested web content provided by the content server 44 will pass through the intermediation platform 60 on its way from the content server 44 to the portal 46, for delivery of the content in turn to the mobile station 30.)

Additionally, the intermediation platform 60 is then shown linked with a core packet network 64, which may be owned and operated by the wireless carrier. And interstitial servers 62 then sit as nodes on the core packet network 64.

As with FIG. 8, one of many possible variations in the arrangement of FIG. 8 is that the gateway 40 and portal 46 could instead sit on core packet network 64. Additionally, the intermediation platform 60 could also sit on core packet network 64. And HTTP communications could flow through the core packet network and, particularly, through the intermediation platform 60, on their way between the mobile station 30 and the content server 44.

It should be understood that numerous other arrangements and variations are possible as well. For example, referring to FIGS. 8 and 9, the intermediation platform 60 could instead be inserted in front of the portal 46 (to the left of the portal in the figure). And as another example, the intermediation platform 60 could be integrated as part of the gateway 40 or as part of the portal 46. And as still another example, the intermediation platform 60 could be inserted elsewhere within the HTTP communication path between the client station and content server, such as elsewhere on one or more packet-switched networks between the endpoints, for instance. (For instance, the intermediation platform could reside in an access channel to the content server, so as to maintain control over HTTP communications with that content server.) Further, multiple intermediation platforms 60 could be provided in a single HTTP communication path. For instance, one intermediation platform 60 could be provided for intermediating HTTP requests, and a separate intermediation platform 60 could be provided for intermediating HTTP responses. Still other variations are possible as well.

b. Exemplary Intermediation Platform

Figure 10:
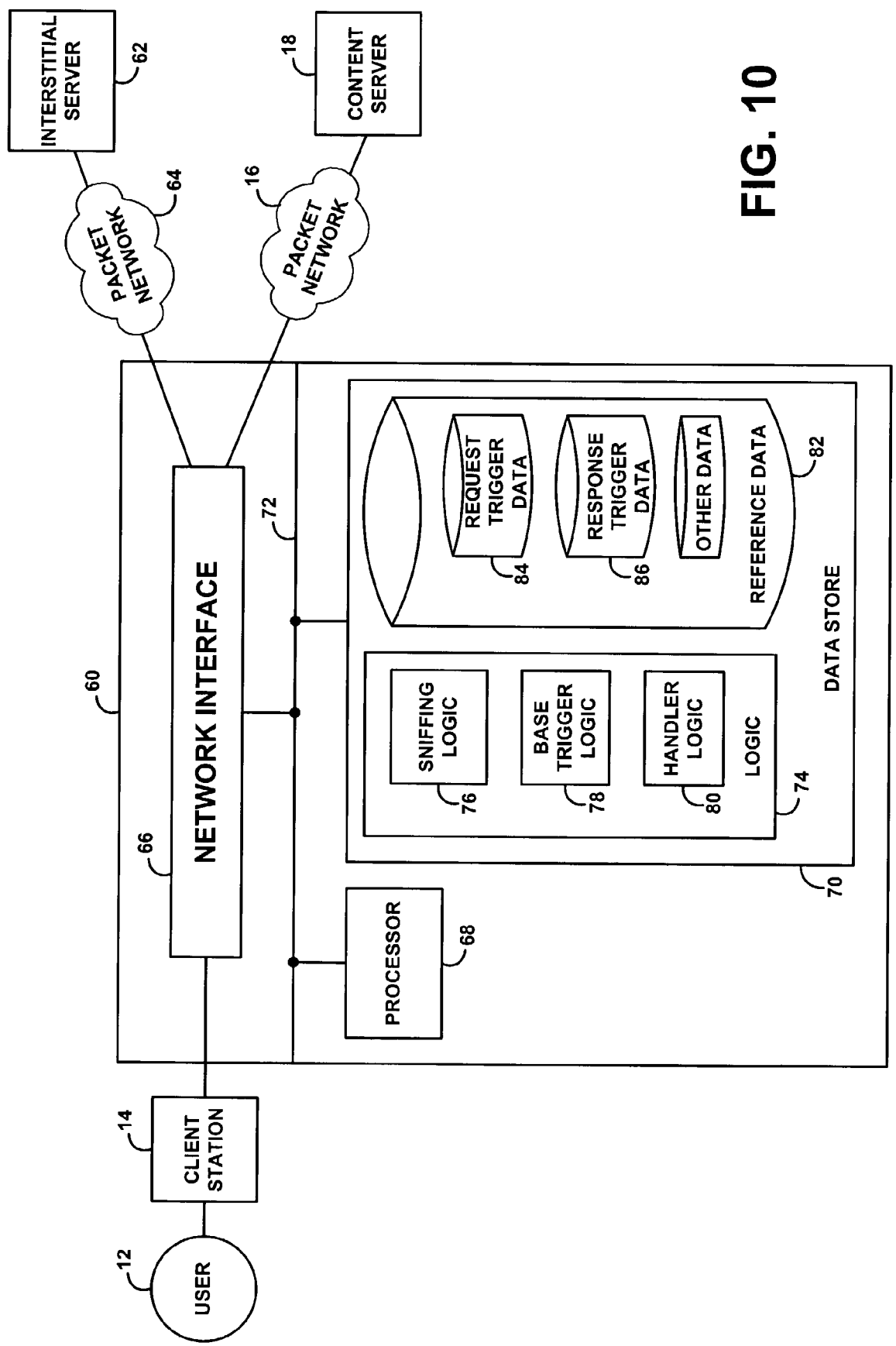
FIG. 10 is a block diagram of an exemplary intermediation platform.

Referring now to FIG. 10, a functional block diagram of an exemplary intermediation platform 60 is shown. The figure depicts the intermediation platform 60 in the context of the arrangement shown in FIG. 7 and uses the same reference numerals as used in that figure. Thus, the platform 60 sits in the HTTP communication path between a client station 14 and a content server 18, and the platform further has access to an interstitial server 62.

As illustrated in FIG. 10, the exemplary intermediation platform 60 includes a network interface 66, a processor 68, and data storage 70, all of which may be linked together by a system bus or hub 72. Generally speaking, the network interface receives 66 and sends IP packets that carry HTTP communications. And the processor executes logic stored in data storage 70 in order to facilitate intermediation in response to those HTTP communications.

In the exemplary embodiment, data storage 70 preferably includes a set program logic 74 (e.g., machine language instructions), which the processor 68 can execute in order carry out various functions described herein. As shown in FIG. 10, the program logic 74 may include (i) detection or "sniffing" logic 76, (ii) base trigger logic 78 and (iii) handler logic modules 80, each of which could be loaded onto the platform or modified as desired, in order to provide a desired set of functionality.

The sniffing logic 76 is executable by the processor 68 to detect and extract HTTP messages (or, more generally, web content) received by network interface 66. Thus, as IP packets enter network interface 66, the processor may apply sniffing logic 76 to determine whether the packets carry an HTTP message (as indicated by the port number (e.g., port 80) set forth in the packet headers, for instance). If so, the processor temporarily pauses transmission of the IP packet(s) that carry the HTTP message (i.e., temporarily pauses the HTTP communication), and the processor extracts the HTTP message and passes it in a function call to the base trigger logic 78.

The base trigger logic 78, in turn, is executable by the processor 68 to determine whether intermediation action should be taken in response to the HTTP message and, if so, to call one or more of the handler logic modules 80. The handler logic modules 80 are then executable by the processor to perform various intermediation functions, such as calling out to an interstitial server 62 and/or modifying HTTP messages.

In addition, data storage 70 preferably includes a set of local reference data 82, which the processor 68 can reference when executing logic 74, so as to facilitate various intermediation functions. In the exemplary embodiment, the reference data 82 may include tables of data (or other forms of data) that indicate what, if any, action(s) to take in response to particular HTTP messages. For example, the reference data 82 may correlate particular HTTP messages (by URI pattern, for instance) with one or more of the handler logic modules 80.

Base trigger logic 78 may thus refer to the reference data 82 in order to determine whether to call a particular handler module in response to a given HTTP message, or whether to simply allow the HTTP message to pass along its way without intermediation. In this regard, the reference data 82 may include (i) request trigger data 84, which specifies which, if any, handler module(s) to call in response to various HTTP request messages, and (ii) response trigger data 84, which specifies which, if any, handler module(s) to call in response to various HTTP response messages.

According to the exemplary embodiment, the request trigger data 84 can generally include (i) a whitelist table, (ii) a URI-pattern table and (iii) one or more exception tables (possibly keyed to action type, username or other variable). Though the request trigger data 84 could take other forms as well.

An exemplary whitelist table will list the domains of web hosts as to which intermediation might be performed. If intermediation platform 60 is programmed to intermediate HTTP requests that are directed to a given domain (such as sprintpcs.com, for instance), the whitelist will preferably list that domain as one of those eligible for intermediation. Whereas, if the platform is not programmed to intermediate HTTP requests from another given domain, the whitelist will preferably not list that other domain.

In this regard, in order to determine the domain name to which a given HTTP request is destined, the intermediation platform could analyze the packet(s) that carry the request. For instance, the platform could read the domain name from the URI set out in the packet payload. Alternatively, the platform could read the IP address to which the packet(s) are destined and could then perform a reverse domain name lookup (e.g., by querying a domain name server (DNS)), to determine the corresponding domain name.

The URI-pattern table, in turn, will list request-URIs or request-URI patterns (e.g., with wildcards, as a regular expression for instance) as to which intermediation should be performed. Further, the URI-pattern table will specify one or more actions that platform 60 should take in response to an HTTP request directed to that URI. By way of example, for each URI as to which the platform is to perform intermediation, the URI-pattern table may include a record that specifies one or more of the handler logic modules 80 that should be invoked. (Where multiple actions are specified, there could be a defined order of carrying out the actions. Further, there could be coalescence between multiple actions, such as asking a user for a password just once even though multiple actions require prompting for the password.) For instance, each record of the exemplary URI-pattern table may include a URI-pattern field, which specifies a URI-pattern, and an Action field, which lists the name(s) of the handler logic module(s) to run.

An exception table may then provide for exceptions to intermediation. By way of example, if the intermediation function is to ensure user payment for web content before the web content is sent to client station 14, an exception table might specify that a particular user has already paid for the content, so that no intermediation is required for that user. Other examples are also possible. And note also that some or all of these reference tables could be maintained elsewhere and queried as appropriate by the intermediation platform 60.

Thus, in exemplary operation, the processor 68 will consider an HTTP request to determine whether intermediation should be performed in response to the request. If the target domain referenced in an HTTP request message is listed in the whitelist table, the request-URI matches an entry in the URI-pattern table, and no exception precludes intermediation, then the processor may call one or more handler logic modules 80 designated by the URI-pattern table. Otherwise, the processor may send the HTTP request, via network interface 66, along its way to the content server 18.

In this regard, as noted above with reference to FIG. 8, a gateway between the client station and the intermediation platform could be arranged to carry out some functions that would otherwise be carried out by the intermediation platform. Whitelisting is an example of one such function. In particular, upon receipt of an HTTP request from a client station, the gateway could consult a whitelist table so as to determine initially whether the HTTP request should be intermediated. If so, the gateway could send the HTTP request to the intermediation platform. And if not, the gateway could send the HTTP request more directly to the packet network 16 for transmission to the content server, bypassing the intermediation platform.

Further, as also noted above, the gateway could function to insert a user ID into an HTTP request. In the exemplary embodiment, if the gateway sends an HTTP request to the intermediation platform, the gateway could send a plaintext version of the user ID to the platform. The platform could then encrypt the user ID before sending the request along to the content server. Alternatively, if the gateway sends an HTTP request more directly to the packet network 16, the gateway itself could encrypt the user ID before sending the request along its way.

Similarly, according to the exemplary embodiment, the response trigger data may include a whitelist table and a URI-pattern table, so as to trigger intermediation when an HTTP response message comes from a specific domain and, more particularly, from a specific URI. As a general matter, the whitelist table and URI-pattern table on the response side could function in the same manner as those described above for HTTP requests (and could be integrated with those tables, such as by having columns respectively for request processing and response processing).

Thus, if the intermediation system is set to perform intermediation on HTTP responses from a given domain, then whitelist table may list that domain. And if the intermediation system is set to perform intermediation in response to HTTP responses from a given URI (or URI pattern), then the URI-pattern table may list that URI (or URI pattern) and may point to one or more of the handler logic modules 80 that should be invoked in order to carry out the intermediation.

Note that the domain and URI may be indicated as header parameters in the HTTP response, or the intermediation platform 60 may have a record (expressly or implicitly) of those parameters if the platform 60 opened its own TCP socket with the content server. Still alternatively, a content server that is arranged to facilitate intermediation could include domain and URI indications (expressly, or as representative codes) in any predefined position in an HTTP response, so as to provide the information to the intermediation platform 60; the intermediation platform 60 may then be programmed to detect those indications so as to identify message origin.

Additionally, or alternatively, the response trigger data in an exemplary embodiment could include a markup-pattern table. As presently contemplated, the markup-pattern table can be akin to the URI-pattern table. However, rather than (or in addition to) triggering response intermediation based on URI-pattern, the markup-pattern table can trigger intermediation based on particular elements of markup language within the web content that the content server 18 has provided in the HTTP response message. Examples of such markup language elements include specific tags, specific tag/value pairs, and combinations of these or other elements, whether or not the elements are set forth in comments or as language intended to be interpreted by the browser on the client station 14. (Further, as with URI-patterns as described above, a markup-pattern could be specified as a regular expression, with wildcards for instance.)

Thus, each record of an exemplary markup-pattern table might include (i) a markup-pattern field, which specifies one or more elements of markup language, and (ii) an Action field, which points to one or more handler logic modules 80 to call when that markup-pattern appears in an HTTP response. Further, the Action field, or one or more other fields could specify additional parameters to use in carrying out intermediation. And still further, each record of the exemplary markup-pattern table could also be keyed to a particular domain and/or particular URI (or URI pattern), so as to restrict markup-based intermediation to HTTP responses from that particular domain and/or that particular URI.

Note that variations on the foregoing triggering mechanisms, and other triggering mechanisms altogether, are also possible on both the request side and the response side. For example, logic 74 could be arranged to trigger intermediation based on other fields in an HTTP request or response message, or based on external factors, such as time/date, or current network conditions. And as another example, logic 74 could be arranged to trigger intermediation for all HTTP messages if desired. Other examples are possible as well.

Further, it should be understood that intermediation platform 60 can take other forms as well. For instance, network interface 66 itself could comprise a processor that sniffs packets and identifies HTTP messages. As such, the network interface could be a programmable level-7 content switch or a programmable HTTP proxy. The network interface could then also be programmed to apply the base trigger logic and even the handler logic. Or the network interface could be tied to an application server and/or database server that carries out those other functions. Thus, for instance, when the network interface detects an HTTP message, it could pass the message to the application and/or database server for further processing. Other variations are also possible.

c. Exemplary Interstitial Communication

With the benefit of the exemplary embodiment, an intermediation system may perform a variety of useful intermediation functions when it detects an HTTP message passing between a client station 14 and content server 18. According to the exemplary embodiment, one of those functions could be engaging in "interstitial communication" with the client station (and, more specifically, with the user 12). In particular, the intermediation system may pause the HTTP communication between the client station 14 and content server 18 and instead, itself (or through some agent), communicate with the client station 14.

The intermediation system can carry out interstitial communication in various ways, applying a suitable set of interstitial communication logic. Preferably, but only by way of example, the intermediation system could itself engage in HTTP communication with the client station 14. This process will work particularly well, because the browser on client station 14 is waiting for an HTTP response to an HTTP request that it has sent to the content server (or to a portal or proxy that gets content from the content server).

Within the intermediation system, the intermediation platform 60 may itself engage in interstitial communication with the client station 14. (For instance, a handler logic module 80, when invoked, may send an interstitial HTTP response to the client station 14). However, according to the exemplary embodiment, the bulk of the interstitial communication function will instead be offloaded to interstitial servers 62.

This interstitial communication can occur in many different ways. As one example, for instance, after the platform 60 receives an HTTP request originally from client station 14 and determines that intermediation action should be taken, a handler logic module 80 may open a TCP socket with the interstitial server 62 and send an HTTP request to interstitial server 62, providing the interstitial server with the user's original HTTP request, and invoking a designated logic module or object on interstitial server 62 to process the user's HTTP request.

Interstitial server 62 may then responsively analyze the user's HTTP request and, by reference to user profile data and/or other reference data, may generate or select an appropriate "interstitial screen" to send to the client station 14. In this regard, as used herein, the term "interstitial screen" refers to web content that is to be provided interstitially to client station 14.

In the exemplary embodiment, the interstitial server 62 may include in the interstitial screen a hyperlink (e.g., button or text link, generally an HREF) that points to the interstitial server 62 (hereafter an "interstitial hyperlink"). That way, when the browser on client station 14 presents the interstitial screen to the user 12, the user can respond to the interstitial server 62 by clicking on the hyperlink. Further, the interstitial server 62 may advantageously set forth the user's original HTTP request as a query parameter (or in some other manner) in the interstitial hyperlink, in order to preserve the user's original HTTP request.

The interstitial server 62 may then send the interstitial screen in a 200 OK response to the handler logic module 80 on the intermediation platform 80. And, upon receipt of that response, the handler logic module 80 may extract the interstitial screen (i.e., the markup language carried in the 200 OK response) from the response and insert it into a new 200 OK message to the client station 14. The handler logic module 80 may then send the new 200 OK message, via network interface 66, to the client station 14.

Upon receipt of the 200 OK response, a web browser on client station 14 may then display the interstitial screen to user 12. In turn, the user may click on the interstitial hyperlink to reply to the interstitial server. As a result, the web browser will send a new GET request to the interstitial server. Alternatively, if the user and/or client station provides data in response interstitial screen (such as by filling in form fields in the screen), the web browser might instead send an HTTP "POST" request to the interstitial server. In any event, the new HTTP request that the web browser sends to the interstitial server will preferably carry as a query parameter the user's original HTTP request, as noted above.

As the new HTTP request is passing between the client station 14 and the interstitial sever 62, the intermediation platform 60 will detect the request. Noting the URI of the interstitial server, a handler logic module 80 on the intermediation platform 60 may then open a new TCP socket with the interstitial server 62 and send an HTTP request through that socket to the interstitial server 62, providing the interstitial server with the client's new HTTP request. And again, the interstitial server 62 may then respond to the client station 14 in the same manner.

This back and forth communication between the interstitial server 62 and the client station 14 can continue as long as necessary, preferably preserving the user's original HTTP request the whole time. (Alternatively, the intermediation platform 60 or interstitial server 62 could maintain a record of the user's original HTTP request and could tie that record together with the interstitial communication. For instance, the interstitial server 62 could correlate the request and interstitial communication with a unique communication (or interstitial conversation) identifier or key.)

Once the interstitial server 62 has completed its interstitial communication with the client station 14, the interstitial server 62 may signal to the intermediation platform 60 to send the user's original HTTP request along its way to content server 18. To do this, in the exemplary embodiment, the interstitial server 62 may return a 200 OK response to the handler logic module 80, providing the user's original HTTP request as the return data. When the handler logic module 80 receives that 200 OK response, the handler logic module 80 may detect the HTTP request as the return data and may responsively send the HTTP request, via network interface 66, to the content server 18. (Note that the intermediation system could also modify the user's original HTTP request in some manner before sending it along its way to the content server 18.)

Alternatively, the interstitial server could itself pass the original request along to content server 18. Upon receipt of a response from content server 18, the interstitial server could then pass that response along to the client station.

It should be understood that the communication mechanism between the intermediation platform 60 and the interstitial server 62 could take forms other than that described above. For instance, the platform and server could communicate by remote method invocation (RMI) or remote procedure call (RPC). Or, as noted above, the platform and server could be integrated on a common server, so that remote communication does not take place.

3. Exemplary Intermediation Functions

As noted above, an exemplary intermediation system can carry out many useful intermediation functions. As presently contemplated, these functions include the following: (a) embellishing web content, (b) managing payment for web content, (c) managing user-specific information, (d) dynamically inserting web content, (e) trapping HTTP errors and (f) providing notice of interstitial-communication. These functions will be described in the following sections.

a. Embellishing Web Content.

An exemplary intermediation system, such as that described above for instance, can be used to embellish web content that is being sent from a content server to a client station. In particular, when the intermediation system receives an HTTP response from the content server, the intermediation system can add one or more explanatory objects into the web content before sending the HTTP response along its way to the client station. When the client station receives the HTTP response, the web browser will then display, or otherwise present, the explanatory object(s) along with the underlying web content provided by the content server.

The intermediation system can add an explanatory object into the web content by modifying the markup language to include the explanatory object or by modifying the markup language to include a reference to the explanatory object. A reference to the explanatory object could point to the object on a server remote from the client station. In that case, the browser would separately load the object from the server and present the object together with the underlying web content. Or the reference could point to the object stored locally on the client station. In that case, the browser could load the object from storage on the client station and present it with the underlying web content (or contemporaneously in another browser window).

(Note that the "explanatory object" is an object that the client station will present to a user as part of the underlying web content. This is to be distinguished from some other sort of object (e.g., a comment that a browser would generally disregard) that the client station will not present to a user as part of the underlying web content. For this reason, the term "explanatory presentation object" can be used interchangeably with the term "explanatory object.")

The explanatory object can be embodied in various forms. By way of example, and without limitation, the explanatory object could be embodied in (i) display text, which the browser would display as text in the web page, (ii) a graphic, which the browser would display graphically in the web page, or (iii) a sound, video and/or other media clip, which the browser might play out to the user while presenting the web page. Further, the object could be hidden in the web page until the user takes an action, such as rolling a mouse over the object or over some other object that triggers the explanatory object to be presented (e.g., as a pop-up display or media presentation), or until another event occurs. The explanatory object could take other forms as well.

The intermediation system can strategically place the explanatory object into the web content so that the explanatory object will be presented in conjunction with a particular aspect of the underlying web content, thereby giving the user an explanation about that aspect of the web content. By way of example, and without limitation, if the explanatory object is a visual object (e.g., text or graphic) the system could insert the object just before, after, above or below the aspect to be explained, or otherwise nearby or logically associated with the aspect to be explained. Alternatively, the system can cause the explanatory object to be presented at some other position or in some other manner.

Through use of this technique, the intermediation system can advantageously explain to the user what will happen when the user clicks on (or otherwise invokes) a given hyperlink in the web page. For example, the explanatory object can advise the user where the user will be taken when the use clicks on the link. In this regard, the explanatory object can advise the user that the user will be taken to an interstitial web site when the user clicks on the link (i.e., that the link will cause the browser to load an interstitial screen). For that purpose, the explanatory object might be a predefined graphic indicative of the intermediation system.

Thus, for instance, if an access-channel provider (e.g., carrier) provides intermediation service for various content providers, the predefined graphic could be a logo or other symbol associated with the access-channel provider. That way, when the user sees that predefined graphic in conjunction with a hyperlink on a web page that the user is viewing, the user will know that, when the user clicks on the link, the user will be taken to an interstitial web page hosted by or on behalf of the access-channel provider.

As another example, the explanatory object could advise the user that, when the user clicks on the link, the user will be sent to a charge-advice system and will be asked to pay for web content associated with the link. In this regard, the explanatory object might be text or graphics that somehow indicates a cost for the web content.

The indication of cost could be a general indication that there is a charge to access the web content. As such, the explanatory object could be a predefined (e.g., specially colored or styled) currency symbol (e.g., dollar sign) generally indicating that there is some user-cost for the web content referenced by the hyperlink (e.g., that the user will pay, that the user will be asked to pay or to agree to pay, when the user clicks on the hyperlink).

Or even better, the indication of cost could be a specific indication of the price that the user will be asked to pay or to agree to be billed for (or that the user will automatically pay or be charged) for the web content when the user clicks on the link. For instance, the explanatory object could be specially colored display text that parenthetically sets forth the price of the web content.

As still another example, the explanatory object could advise the user that, when the user clicks on the link, information about the user (e.g., the user's current location, the user's username and password, the user's credit card charging information, or other information) will be conveyed to the content server together with the HTTP request, or the user will be asked to approve interstitial insertion of the user's information into the HTTP response on its way to the content server. In this regard, the explanatory object might be an indicator that is associated with the type of information the will be conveyed to the content server. For instance, if the information is authentication information such as username and password, the indicator could be a graphic of a key opening a lock. Many other examples of explanatory objects are possible as well or will be developed in the future.

To facilitate embellishment of web content, the exemplary intermediation system described above could include an embellishment handler module (also referred to as "embellishment logic"), among handler logic modules 80. The embellishment handler module could be executable by the processor 68 to modify markup language in an HTTP response, so as to add into the markup language a designated explanatory object (and perhaps to otherwise modify the markup language, if desired).

In turn, the URI-pattern table and/or the markup-pattern table in the reference trigger data 86 could point to that embellishment handler module and could specify a particular explanatory object to be inserted when the HTTP response originates from a particular URI and/or contains a particular markup-pattern. (Alternatively, the embellishment handler module itself could specify the explanatory object to be inserted).

(Alternatively, on the response side, just as on the request side, the intermediation system could reference a whitelist table, which indicates generally whether the HTTP response is to be embellished or otherwise intermediated. If the system determines that some intermediation action is to be taken, then the system could proceed to consider the URI-pattern table and/or markup-pattern table to determine whether to execute the embellishment handler module.)

As one example, without limitation, the markup-pattern table could include records that list particular hyperlinks and that specify, for each hyperlink, how much a user should be charged for accessing the referenced content.

For instance, assume the content provider is a news magazine company, and, through content server 18, the magazine company offers electronic copies of articles that have appeared in past issues of the magazine. Thus, content server 18 may host an article-listing web page that lists available articles and that links each listing to an HTML copy of the respective article. Assume further that the magazine company has contracted with the intermediation-system provider to bill users on behalf of the magazine company, for access to those articles. (Alternatively, the magazine company might own, operate or otherwise control the intermediation system itself).

In this scenario, the intermediation system might be provisioned to include in its reference trigger data 86 listings of each hyperlink that could appear in the magazine company's article-listing web page, as well as respective charges for each article (or generally for any article). For instance, the markup-pattern table might include a number of records, each keyed to the URI of the article-listing web page, and each then specifying the "HREF" markup language that would define one of the article hyperlinks set forth on that page. In the action field of each record, the table could then recite a function call to the embellishment handler routine and could specify the associated charge for the linked content.

In operation, when the intermediation platform 60 receives an HTTP response from the content server 18, processor 68 may search the markup-pattern table for all records keyed to the URI of the article-listing web page. As a result, the processor 68 may establish a list of hyperlinks in the web page, and their corresponding costs for access. As indicated by the records, the processor 68 may then call the embellishment handler routine so as to facilitate insertion of the prices adjacent to each hyperlink in the page. And the embellishment handler routine may do so.

Thus, when the intermediation platform sends the HTTP response along its way to the client station 14, the web content may advantageously include next to each listed article an indication of how much the article costs. Conveniently, this can be done without requiring the content server 18 (or, more generally, content provider) to be aware of pricing or to otherwise manage pricing at all.

Alternatively, reference data 70 on the intermediation platform could include a price-table, which specifies costs for accessing particular URIs. (This could be integrated as part of the URI-pattern table, such as in a price field of each record, if desired). Further, the response trigger data 86 could simply provide for calling the embellishment handler module in response to a given hyperlink or URI. In that case, when the intermediation system receives an HTTP response that originates from a particular URI and/or that includes a particular hyperlink, the embellishment handler module may refer to the price-table to determine the cost for accessing referenced content. And the embellishment handler routine could then insert an indication of that cost into the web page in conjunction with the link to the content.

Given the foregoing description, many other examples of web content embellishment can be developed as well.

b. Managing Payment for Web Content

For many years, much of the content available on the World Wide Web was free for any authorized web user to access. The owners and operators of content servers (hereafter "content providers") relied in large part on advertising revenues, selling ad space such as "banner ads" on their web pages. In recent years, however, operation costs have pushed more and more content providers to begin charging for access to their web content.

In order for a content provider to charge users for access to its web content, the content provider generally employs a mechanism to collect payment from users, or to track prepaid use-licenses where users have paid in advance for a certain timeframe or quantity of access. This process can be burdensome and costly for many content providers.

The exemplary embodiment provides a mechanism to facilitate management of user payment on behalf of a content provider, or at least management of user payment for content provided by a content provider. (Note that the intermediation system could be owned and operated by the content provider as well (in which case, the billing is done by and on behalf of the content provider.)) Namely, an exemplary intermediation system such as that described above could be used to advise a user how much the user will be asked to pay when the user seeks access to given web content. Further the intermediation system could be used to collect payment from a user, or receive the user's agreement to pay or to be billed, before passing the user's request for web content on to the content provider.

i. Pre-Nonrepudiation

When an intermediation system provider ("intermediary") such as a carrier bills a user for content (or services) delivered by a content provider, the intermediary should be able to prove that the user agreed to pay for the content. If an intermediary cannot prove that the user agreed to pay for the content, then the user might repudiate the charge. Therefore, the process of proving that a user agreed to pay for a charge may be referred to as "non-repudiation."

With the exemplary embodiment, an intermediation system can advantageously be used to perform non-repudiation before a user even requests web content. To do so, the intermediation system can embellish a web page that contains a link to the web content, by adding, in connection with the link, an indication of the price that a user will be expected to pay for the web content if the user selects the link. Thus, before the user even requests the web content, the user will have notice of how much the web content will cost.

This process can be referred to as "pre-nonrepudiation," since it is a mechanism that helps to secure a user's agreement to pay for content before, or at the time, the user clicks on a hyperlink. At a minimum, it functions to support an argument that a user who clicks on the link knew how much the content will cost. By performing this function in an intermediation system, the intermediary can thus better prove that users incurred various costs, and the intermediary can thus better recoup costs from the content provider.

An exemplary mechanism for carrying out this function was described to some extent above. Generally, the intermediation platform 60 may maintain a markup-pattern table that lists hyperlinks and associated charges. When the platform 60 receives an HTTP response carrying a set of markup language that includes one of the listed hyperlinks, the platform 60 may then readily modify the markup language so as to include next to the hyperlink a textual indication of the charge associated with the referenced content.

FIGS. 11–15 illustrate this process by way of example. These figures assume again that a news magazine company hosts a web page that lists hyperlinks to articles available for purchase. And the figures also assume that the news magazine company has contracted with an intermediary (e.g., an access-channel provider) to have the intermediary (on behalf of the news magazine) bill users for accessing these articles. (Conveniently, the content provider can then collect payment from the intermediary, rather than individually from all of the users; and the content provider can rely on the intermediary to authorize and authenticate individual users.) Further, the figures assume that the cost varies from article to article.

FIG. 11 depicts how the list of hyperlinks might normally appear on the news magazine company's web page when displayed at client station 14. (Underlining reflects a hyperlink.) FIG. 12, in turn, depicts the markup language that might underlie that list of hyperlinks. As shown, the source code underlying each link begins with an "<A HREF>" tag that points to an HTML file of an article, and each link concludes with a closing </A> tag. Before the closing tag, each link includes display text (such as "Article #1"), which a browser will display as the respective hyperlink.

In accordance with the exemplary embodiment, the response trigger data 86 in intermediation platform 60 may be provisioned so as to include listings for each of these hyperlinks and to indicate the respective charges. Thus, by way of example, FIG. 13 displays four records that might appear in the table. Each record in this example recites the opening <A HREF> tag as the markup pattern and specifies ADDCOST( ) as the associated action, indicating the associated charge as an argument to the function call. Handler logic modules 80 might then include an ADDCOST( ) function, which is executable by processor 68 to add the indicated cost into the referenced hyperlink.

In operation, when the intermediation platform 60 receives an HTTP response that carries the news magazine's web page, processor 68 may reference the markup-pattern table and determine that the four hyperlinks are listed in the web page. For each hyperlink, the processor 68 may then call the ADDCOST( ) function, passing the hyperlink and the cost to be added. And processor 68 may then execute the ADDCOST( ) function accordingly.

FIGS. 14 and 15 illustrate what might result from this process. FIG. 14 depicts the markup language that may result. As can be seen, in each hyperlink, the ADDCOST function has inserted the cost of the referenced content parenthetically just after the closing </A> tag. And FIG. 15 then shows what the resulting web page may look like. In particular, after each hyperlink, the respective cost appears parenthetically.

In the exemplary embodiment, the intermediation platform 60 may also include an exception table on the response side, to avoid performing pre-nonrepudiation for users who have already paid for content (or who are otherwise licensed to receive the content). In particular, reference data 82 could include a digital rights management (DRM) table that indicates, per user, rights that the user has already paid to receive. For instance, the DRM table could indicate that a given user, having a given username, is credited with one month worth of articles from www.newsmagazine.com. In that case, if platform 60 receives the above HTTP response and the response is destined for that user (as indicated by username field in the HTTP response (or in the associated HTTP request), for instance), then processor 68 may decline to add the price per article into the web page. For other users, however, the processor 68 may insert the cost.

As noted above, cost-embellishment logic could add a specific indication of the price to access referenced web content. Alternatively, cost-embellishment logic could work just as well to add a general indication that there is some cost to access referenced web content. For example, as noted above, the logic could function to insert a cost indication, such as a parenthetical dollar sign for instance, in conjunction with a given hyperlink. Other examples are also possible.

ii. Interstitial Billing (Charge-Advice)

As noted above, when a user requests web content, the intermediation platform 60 can detect the request and can send the user to an charge-advice system in order to collect payment from the user. Generally, the instances in which the intermediation system will seek to collect payment from a user on the request side can be the same instances when the intermediation system seeks to perform pre-nonrepudiation on the response side (in the preceding HTTP transaction). Alternatively, an intermediation system could do one but not the other.

In the exemplary embodiment, the URI-pattern table will include listings for URIs as to which users are expected to pay for access. Further, each record listing a URI may then point to an INTERSTITIAL-BILLING( ) function defined by the handler logic modules. Thus, referring to FIG. 16, several example records of a URI-pattern table are shown, consistent with the example above.

Note that this data could be combined with the markup-pattern table entries described above. For instance, reference data 82 could include a table that lists URIs and specifies, on the response side, to call the ADDCOST( ) function and, on the request side, to call the INTERSTITIAL-BILLING( ) function. FIG. 17 shows such a combination table by way of example. Note that each record could have both a request action and a response action, or a given record might have only a request action or only a response action.

Further, the DRM table could function as an exception table on the request side. In particular, if a user already has rights to receive particular content, then it might be inappropriate to collect payment from the user for that content.

Thus, in an exemplary operation, assume that a user causes a web browser at client station 14 to send an HTTP request for content at "www.newsmagazine.com/article0001.htm", which resides at content server 18. When the intermediation platform 60 receives the request, processor 68 may refer to the URI-pattern table to determine whether intermediation action should be taken. Processor 68 may thereby determine that it should call the INTERSTITIAL-BILLING( ) function and may do so accordingly.

Executing the INTERSTITIAL-BILLING( ) function, processor 68 may signal out to interstitial server 62, such as by sending an HTTP request carrying the user's original GET request, as described above. In turn, interstitial server 62 may send an interstitial charge advice screen to client station 14, requesting the user's payment or agreement to pay or be billed. The user may pay, for instance, by entering credit card information into the charge advice screen and clicking a link back to the interstitial server 62, in which case the web browser would then send an HTTP request to the interstitial server, providing the user's credit card information. The interstitial server 62 may then validate the credit card information, record the charge in a billing system, and then signal to the intermediation platform 60 to send the user's original GET request along to the content server 18. The interstitial platform may then do so, completing execution of the INTERSTITIAL-BILLING( ) function.

It should be understood that the interstitial billing function can take many other forms as well. For example, rather than signaling out to an interstitial server 62, the intermediation platform itself could communicate with the user to collect payment or to collect an agreement to pay. As another example, rather than or in addition to collecting payment, the intermediation system could collect from the user the user's agreement to be billed by the intermediary on behalf of the content server. In that case, a specific price may or may not be recited. Still other examples are possible as well.

Interstitial billing can also be carried out on the response side, in accordance with an exemplary embodiment. In this regard, the response trigger data 86 could associate a given URI with the INTERSTITIAL-BILLING( ) function. Thus, when the system receives an HTTP response providing content from that URI, the system could pause transmission of the response and may engage in interstitial communication with the user so as to collect payment. After collecting the user's payment or agreement to pay or be billed, the system may then send the HTTP response along to the client station, for presentation of the requested content to the user.

iii. Selectively Charging for Web Content

In accordance with the exemplary embodiment, the intermediation system can be arranged to selectively bill users for web content, based on various criteria, such as the identity of the web site accessed and/or the identity of the user accessing the web site, for instance. Further, the intermediation system could vary the amount that it charges for web content, again depending on various factors, such as the identity of the user for instance.

To carry out this function, the intermediation system may maintain reference data that indicates whether and how much to charge for web content in various scenarios. This reference data, and associated logic, can reside at the intermediation platform 60, at an interstitial server 62, and/or elsewhere.

By way of example, the intermediation system may maintain a record of web pages that a given user or group of users is allowed or not allowed to access within a paid account. If such as user attempts to access a web page that is not one of those allowed according to that record, then the intermediation system may charge the user (or obtain the user's agreement to pay or be billed) for accessing the page. In this regard, the intermediation system may then perform pre-nonrepudiation, interstitial billing, and/or other related intermediation functions. Other examples are also possible.

c. Managing User-Specific Information

While much of the content on the World Wide Web is static, a content provider can also provide content or take other action based on user-specific information. For example, if a content provider knows that a given user has recently accessed certain web pages (or has other information about the user's navigation history), the content provider could serve the user with a web page that lists hyperlinks to those recently accessed pages. As another example, if a content provider knows a user's billing information (e.g., credit card number, expiration date, billing address, etc.), the content provider can allow a user to make a purchase without requiring the user to input the billing information. And as another example, if a content provider knows a user's current location, the content provider can provide the user with a location-based service, such as serving the user with a web page that lists nearby establishments or local traffic and weather conditions, for instance.

To facilitate these or other customized services, a content provider can maintain a profile store that ties usernames together with various user-specific information. When the content server receives an HTTP request that indicates a given username, the content provider can dip into the profile store to identify user-specific information for that user and can then provide a custom service based on that information.

Unfortunately, however, it can be difficult and costly for a content provider to maintain such a profile store. Further, certain user-specific information could be dynamic. For instance, user location information may change as the user moves from one client station to another or as the user's client station moves from one location to another. Further, a content provider might need to obtain that sort of information from another party, such as from an access-channel provider for instance.

In accordance with the exemplary embodiment, an intermediation system such as that described above can be used to make user-specific information available to a content provider, so as to facilitate custom services. Generally speaking, this aspect of the exemplary embodiment may involve (i) obtaining a user's approval to provide or disclose user-specific information to a content provider, (ii) providing the user-specific information to a content provider, and/or (iii) making the user-specific information available for access or reference by a content provider.

i. Obtaining User Approval to Provide User-Specific Information to a Content Provider.

An exemplary intermediation system can function to secure a user's agreement or authorization (generally "opt-in") to allow disclosure of user-specific information to a content server. To do so, when the intermediation system receives an HTTP request destined for a given content server, the intermediation system may engage in interstitial communication with the user so as to obtain the user's opt-in.

To facilitate this function in the exemplary intermediation system described above, the URI-pattern table can associate certain request-URIs with an OPT-IN( ) handler logic module 80, which can be called in order to invoke the interstitial communication. In this regard, the OPT-IN( ) function-call may specify as one or more arguments the type(s) of user-specific information to be provided to the content server.

As an example, for a given URI, the function-call might read "OPT-IN(username, password)", to reflect a desire to pass the user's username and password to the content server. As another example, for another URI, the function-call might read "OPT-IN(address, cc, exp)", to reflect a desire to pass the user's billing address, credit card number and credit card expiration date (generally "billing information") to the content server. And as another example, for still another URI, the function-call might read "OPT-IN(location)", to reflect a desire to make the user's current location available to the content server.

In operation, when the intermediation platform 60 receives an HTTP request seeking web content from a given URI at content server 18, processor 68 may then refer to the URI-pattern table and thereby determine that it should call the OPT-IN( ) function in order to seek user approval for disclosure of particular information to the content server 18. And through execution of the function, the processor 68 may then signal out to interstitial server 62 in the manner described above so as to trigger interstitial communication and to thereby obtain the user's opt-in.

In the exemplary embodiment, the intermediation system (e.g., the intermediation platform 60 and/or interstitial server 62) will include or have access to a user profile table, akin to what a content server might normally maintain as noted above. Each record of the user profile table could be keyed to a particular username and could then specify user-specific information for that user.

In order to populate the user profile table with information, a web interface could be provided through which users can load their information. Alternatively, the intermediation system could build the profile information dynamically. For instance, when a user provides information to a content server in an HTTP request, the intermediation system could engage in interstitial communication with the user to ask the user whether the user would like to add the information to the user's profile record for later reference. And the intermediation system may then add the information to the user's profile record. Alternatively, but less preferably, the intermediation system could extract the information and add it to a profile for the user without asking for user permission in each instance.

The system could maintain this user profile information at the intermediation platform 60 and/or at the interstitial server 62, in a user profile table, for instance. However, the information will more likely be maintained at a centralized server, accessible by the intermediation system. If this information is maintained by or accessible to the intermediation platform 60, the platform can extract pertinent user-specific information and send the information to the interstitial server 62 when the platform 60 signals out to the server.

In the manner described above for instance, the interstitial server 62 may then send an interstitial screen to the client station 14, seeking the user's opt-in for disclosure of the user's information to the content server 18. On the interstitial screen, the server 62 could generally describe the type of information to be disclosed to the content server 18 (e.g., "Please click below to approve disclosure of your name, address and telephone number to Content Server Co."), and/or the server 62 could recite the specific information to be disclosed to the content server 18 (if available to the server 62) ("e.g., "Please click below to approve disclosure of your name (John Q. Public), address (123 Any Street) and telephone number (123-555-1234) to Content Server Co.")

In response to the interstitial screen, the user can either approve or disapprove the disclosure of the user's information to the content server 18. For instance, the user can click on an "OK" link or otherwise cause the browser to send a suitable HTTP request message to the interstitial server 62. The interstitial server 62 may then interpret that approval as a one-time approval, i.e., to disclose the user's information to the content server 18 in the current transaction. Alternatively, the interstitial server may interpret the approval as a persistent approval, i.e., to disclose the user's information generally to the content server. In either case, the interstitial server may record the user's approval for later reference.

Alternatively or additionally, the intermediation system can work to secure a user's opt-in by embellishing web content that is being sent in an HTTP response to the client station 14. In particular, if the intermediation platform 60 receives an HTTP response destined for the client station, and the response contains a hyperlink to a URI as to which user-specific information should be provided, then the platform 60 could insert into the response an explanatory object that tells the user that the user's information will be disclosed if the user clicks on the hyperlink. (E.g., "By clicking on this link, you consent to allow disclosure of your name, address and telephone number to Content Server Co.") When the user clicks on the hyperlink, the intermediation system can then optionally perform interstitial communication to confirm the user's opt-in, or the system can accept the user's clicking of the hyperlink as sufficient.

ii. Providing User-Specific Information to a Content Provider

According to the exemplary embodiment, the intermediation system can provide user-specific information to a content server, thus reducing or eliminating the need for the user to enter the information (which could be particularly burdensome on certain handheld wireless devices). The intermediation system can theoretically do so without first obtaining user approval. However, an exemplary intermediation system will do so after first obtaining the user's approval, such as through an opt-in process as described above for instance.

The intermediation system can provide the user-specific information to the content server in various ways. Preferably, the intermediation system will provide the user-specific information by inserting the information into the HTTP request being sent to the content server 18 (as an HTTP POST, for instance), thereby establishing what might be called an "embellished request." For example, the intermediation system could insert the user-specific information into the HTTP request as one or more query parameters in the request-URI. Alternatively, the intermediation system could insert the user-specific information in the payload block (message body) of the HTTP request, using the POST method. (Note that this or other changes to a given HTTP message may take the form of generating a new HTTP message that is a changed version of the given message, i.e., that reflects the change(s)). Other examples are possible as well.

Thus, in exemplary operation, when the intermediation platform 60 receives a HTTP request designating a particular request-URI hosted by content server 18, processor 68 may determine by reference to the URI-pattern table that it should call the OPT-IN( ) function. In turn, upon executing the OPT-IN( ) function, the processor (or an entity on its behalf) may refer to the user-profile store to obtain the user-specific information to disclose to the content server 18. And the processor may modify the HTTP request to set forth that user-specific information and then send the modified HTTP request, via network interface 66, along its way to the content server 18.

Alternatively, upon executing the OPT-IN( ) function, the processor may invoke interstitial communication (e.g., by signaling out to the interstitial server 62), so as to first secure the user's approval for disclosure of the user's information to the content server 18. And then the interstitial server 62 or the processor 68 may modify the HTTP request so as to set forth the user-specific information. And the processor may then send the modified HTTP request, via network interface 66, to the content server 18.

In accordance with the exemplary embodiment, an intermediation system can also provide user-specific information to a content server 18 by providing a user with a partially or completely filled in web page form, the contents of which the user can then submit to the content server.

For example, if a content server 18 sends an HTTP response to a client station 14, providing in the response a set of markup language that defines a form, the intermediation system might consult the user's profile record (and perhaps a table that indicates which form fields are which for the given HTTP response) to determine values to insert in the fields (e.g., text boxes) of the form. And the intermediation system may then insert those values into the fields before sending the HTTP response along its way to the client station 14. In turn, the client can submit the already-filled form to the content server.

Thus, for instance, if an HTTP response provides form fields that seek a user's name, address and telephone number, the intermediation system could refer to a user profile store to extract the user's name, address and telephone number. And the intermediation system could provide default values in those form fields. The intermediation system could then send the modified HTTP response to the client station. And the user may submit the completed form as is to the content server, with the form fields already completed by the intermediation system.

As another example, when the intermediation system receives an HTTP POST request from a client station, the intermediation system could fill user-specific information into blank form fields in the response data. In this regard, the intermediation system could notify the user in advance that the intermediation system will take this action, by including one or more indications in the HTTP response that provides the form to the user in the first place. For instance, in the HTTP response that defines the form, the intermediation system could embellish the content by noting parenthetically next to each form field the value that the intermediation system will insert into the response data when the user submits the form.

iii. Making the User-Specific Information Available for Access by a Content Provider As noted above, in some cases, the intermediation system might not itself have access to the user-specific information that is to be disclosed to the content server. Instead, that information might only be available from some other network entity. (That other entity and the intermediation system might be co-owned or co-operated, such as by an access-channel provider, for instance.) In that case, rather than itself providing the user-specific information to the content server, the intermediation system may cause the other network entity to make the user-specific information available for access by the content provider.

A good example of this is facilitating location-based services. In this regard, recent governmental regulations have compelled wireless carriers to implement systems for determining the location of mobile stations, so as to facilitate emergency response services. In turn, carriers and content providers have sought to leverage that information in order to provide commercially valuable location-based services to mobile subscribers.

Location-based services could take many different forms. For example, a content provider could serve the user with a web page that provides location-specific information, such as indications of restaurants, traffic conditions or weather in the vicinity of the user. And as another example, a content provider could send location-based advertisements or other messages to the user or to another entity. Other examples of location-based services are possible as well.

In order to facilitate these location-based services, a wireless carrier may employ a location-server from which a content provider can pull a user's location (or that can push location information to a content provider). Unfortunately, however, privacy concerns and regulations may preclude a wireless carrier from freely disclosing a user's location to a content provider without first obtaining the user's consent.

Through use of an opt-in system such as that described above, an intermediation system can obtain a user's consent to disclose the user's location to a content provider, i.e., to make the user's location available for access by the content provider. For example, when the intermediation system receives an HTTP request designating a request-URI as to which location information is to be disclosed, the platform may engage in interstitial communication with the user so as to collect the user's approval for disclosure of the user's location. Or the intermediation system could obtain the user's approval through embellishment of a preceding web page, as described above.

The intermediation system may then make the user's location available for access by the content provider (or, equivalently, content server), by sending to the location-server (e.g., mobile positioning center (MPC)) a signal indicating that the user's location can be disclosed to the content provider. For instance, the intermediation system may signal to the location-server, providing the location-server with an identification of the user and the content provider. (In a wireless communication system, the user ID might be an encrypted mobile identification number (MIN) or network address identifier (NAI), which might be specified as the username in the HTTP request from the mobile station, or which might be provided by the gateway, as noted above.) And the content provider ID could be indicated by the URI-pattern table.)

When the location server receives the signal from the intermediation system, it may set a flag indicating that the user's location information can be accessed by the content provider. In turn, when the content server 18 receives the GET request from the client station, the content server 18 might query the location-server to obtain the user's location (i.e., the location server may report the user's location to the content server) and may then generate and return to the user a web page customized to provide the user with information that is based on the user's location.

Other examples of making user-specific information available for access by content server may be possible as well. As one other example, for instance, the intermediation system or some other entity could publish the user-specific information to a database system (e.g., a database server or message bus) to which the content server has access.

d. Dynamically Inserting Web Content

Another function that an exemplary intermediation system can perform is to insert web content in an HTTP response that is being sent between a content server and a client station. In particular, the intermediation system can be arranged to detect certain markup language carried in the message body of the HTTP response and to respond to that language by inserting some other markup language. In doing so, the system may delete or comment out (i.e., surround by comment tags) the original markup language, so that the new markup language is inserted instead of (e.g., in place of) the original language. Or the system may maintain the original markup language, so that the new markup language is inserted in addition to the original.

The markup language that the intermediation platform detects in the HTTP response, which may be referred to as a "markup-insertion instruction" or "markup-insertion language" could take various forms. For example, the markup language could be a particular tag, a particular tag/value combination, particular display text, or a combination of these or other elements. Further, the markup language could be language that would normally be interpreted by a web browser (i.e. that is interpretable), such as an HTML tag for instance, and/or the markup language could be language that a web browser would normally ignore (i.e., that is non-interpretable), such as language in HTML comments (possibly including the comment tags) for instance. Still further, the markup language could be contiguous or non-contiguous.

In order to have the exemplary intermediation system perform this markup insertion function, the markup-pattern table can list various markup language elements that constitute markup-insertion instructions. And each such record in the markup-pattern table could point to a MARKUP-INSERTION( ) function in the handler logic modules 80. The MARKUP-INSERTION( ) function could then be executable by processor 68 to insert new markup language in response to the listed markup language (e.g., in place of the markup-insertion instruction) within the HTTP response.

In this regard, reference data 82 on the intermediation platform 60 may include another table that correlates various markup language elements with markup language to be inserted. When processor 68 executes the MARKUP-INSERTION( ) function, it may determine by reference to that table what markup language to insert. Alternatively, the markup-pattern table could specify the markup language to insert, and that language could be recited as an argument in the MARKUP-INSERTION( ) function-call. And still alternatively, the MARKUP-INSERTION( ) function could be hard-coded to insert particular markup or a particular type of markup in response to a given markup-insertion instruction.

The reference data or MARKUP-INSERTION( ) function call could point to a particular location in the markup language, where the insertion is to be made. For instance, when called, the MARKUP-INSERTION( ) function could instruct the processor to insert a particular set of markup language at an absolute location in the page (e.g., at the point where the markup-insertion instruction was located). Or the function could instruct the processor to insert the markup at a relative location (e.g., after a certain number of tags, or in a particular column and row of a table, or the like.)

Advantageously, an exemplary intermediation system could perform dynamic markup-insertion in order to provide consistent graphical user interface elements from web page to web page. By way of example, consider an intermediation system located within a wireless carrier's access channel, as shown in FIGS. 8 and 9 for instance. In this scenario, the wireless carrier may want content providers to format web content in a certain manner, so as to convey a consistent graphical image to the carrier's subscribers.

One way for the wireless carrier to accomplish this is to publish detailed interface guidelines and require content providers (web developers) to follow the guidelines. However, compliance and enforcement issues may exist as the carrier seeks to ensure that web content adheres to the guidelines.

In accordance with the exemplary embodiment, a better solution is to have content providers use markup-insertion language in their web content, and to then have an intermediation system insert some new markup language in place of (or in response to) that markup-insertion language. The new markup language could take the form of particular display text and/or particular tags or the like. And the markup-insertion language could generally or specifically define the desired insertion.

By way of example, the markup-insertion language might designate a particular type of object to be inserted, and the intermediation system could responsively insert markup language that will cause a browser to present the designated object. The object, the markup-insertion language that designates the object, and the markup language that the intermediation system inserts to define the object, can take a variety of forms.

FIGS. 18–20 illustrate a specific example of this insertion process. Referring first to FIG. 18, a record of an exemplary markup-pattern table is shown. The record lists as a markup pattern the following HTML markup language:

<!—<COMBOBOX="US-STATE"
   ORDER="ALPHA">—>

Note that this markup language includes comment tags "<!—" and "—>". Thus, in normal operation, if a web browser were to receive an HTTP response containing this markup language, the web browser would disregard this language.

The exemplary markup pattern recites the tag COMBOBOX with a value "US-STATE", which may mean that the tag calls for insertion of a combo box that lists U.S. states. Further the markup pattern includes the tag ORDER with a value "ALPHA" which may denote that the list of states should be presented in alphabetical order.

FIG. 19, in turn, depicts a set of markup language that might be carried in the message body of an HTTP response message. As shown, the markup language includes display text reading "Please select your state:" and then sets forth the markup-substitution language noted above.

In accordance with the exemplary embodiment, when intermediation platform 60 receives the HTTP response carrying this markup language, processor 68 may detect the markup-insertion language in the message. Consequently, pursuant to the markup-pattern table entry shown in FIG. 18, processor 68 may call the MARKUP-INSERTION( ) function. Upon execution of the MARKUP-INSERTION( ) function, the processor may then substitute for the markup-insertion language a more extensive set of markup language, defining the designated combo-box.

By way of example, the resulting markup language may appear as illustrated in FIG. 20. As shown there, the markup-insertion language has been removed, and an HTML "SELECT" code structure has been inserted in its place. The SELECT structure lists as option values each of the states of the United States (shown only partially in FIG. 20), in alphabetical order, as designated by the markup-insertion language.

After insertion the markup language in the HTTP response, the processor 68 may then send the modified HTTP response along its way to client station 14 (or to a portal or other entity, for transmission of the web content in turn to the client station). Thus, when client station receives the HTTP response, a browser on the client station would then display a drop down combo box as specified by the newly inserted markup language.

In practice, an access-channel provider (such as a wireless carrier for instance) could apply this process to produce an object or set of information customized to reflect an identity of the access-channel provider. For example, if the access-channel provider markets itself with a particular combination of colors or a particular font, the access-channel provider, as intermediary, could customize the object to use those colors and/or that font. And as another example, the access-channel provider could insert its logo in the HTTP response as part of object. Thus, the object could be designed to bear at least one characteristic (e.g., color combination, logo, trademark, trade name, style, etc.) that reflects the marketing identity of the access-channel provider.

Further, the markup language that the intermediation system inserts into an HTTP response could be selected or generated dynamically, based on any of a variety of factors. As an example, and without limitation, the markup language could define or contain user-specific information, or the markup language could be generated based on user-specific information.

As a particular example, the markup language could define a list of the user's instant messaging buddies or some other group list. In this regard, exemplary markup-insertion language might read <DISPLAY-LIST="USER-GROUP"> and might direct the intermediation system to insert into the HTTP response a group list associated with the requesting user. In response to this language, processor 68 might query a group server to obtain the user's group list and might then insert into the HTTP response a listing the group members.

As another particular example, the markup language could define the user's current location (i.e., the client station's current location). In this regard, the markup-insertion language might read <USER-LOCATION> and might direct the intermediation system to insert into the HTTP response an indication of the user's current location. In response to this language, processor 68 might query a location server to determine the user's current location and might then insert into the HTTP response an indication of that location (e.g., location coordinates, a street address, a map graphic showing the user's current location, etc.)

As still another particular example, the markup language could define information based on the user's current location, such as an indication of establishments or services nearby the user's current location. In this regard, for instance, a content provider might pre-register with the intermediation system to provide the intermediation system with reference data to use in establishing the markup language based on a given user's location. Advantageously, this intermediation process can be applied to maintain confidentiality of a user's location, since the intermediary does not need to report the location to the content server or otherwise make the location known.

By way of example, the reference data might be a list ("restaurant_list") of various restaurants, designating for each restaurant a respective name ("restaurant_name") and a respective location ("restaurant_location"). And the markup-insertion language might then be something like "<QUERY> SELECT NEAREST restaurant_name IN restaurant_list WHERE user_location=restaurant_location</QUERY>". In response to this markup-insertion language, processor 68 might query a location server to determine the user's current location ("user_location") and might then determine the nearest restaurant to that location by executing the designated query. And processor 68 may then insert into the markup language the name of that nearest restaurant.

And as another example, the markup language could define a "breadcrumb trail" that indicates the user's web navigation history. For instance, the intermediation system, content provider, access provider and/or another entity could keep a log of web sites that the user has visited. In response to predefined markup-insertion language, processor 68 might then query the log to determine the user's navigation history (if not already provided with the navigation history) and could insert a representative breadcrumb trail (e.g., as text) into the markup language. As presented by the web browser, an exemplary breadcrumb trail might appear as follows: "My Web>Games>Action Games>Game 1".

Further, as another example, the intermediation system may customize the markup language being inserted, based at least in part on the interface capabilities of the client station 14. Examples of such capabilities might be presentation capability of the client station 14 (e.g., display size, ability to present audio or video, color scheme, resolution, ability to signal to a user via LED illumination or device vibration, etc.), user input capability of the client station (e.g., keypad entry, stylus entry, voice entry, etc.), and browser capability (e.g., ability to interpret and react to certain types of markup language, such as certain tags for instance).

In order to carry out this function, the intermediation system may include or have access to data that enables the system to determine the interface capabilities of a requesting client station 14. By way of example, and without limitation, the intermediation system may include or have access to a user profile store that correlates usernames with devices, and a device profile store that correlates devices with device capabilities. Thus, when the intermediation system receives an HTTP response destined for a given user, the system can refer to the user profile store to identify the device being used by the user (i.e., the device that is the client station 14), and the system can then refer to the device profile store to determine the capabilities of that device.

For instance, if the client station is a 3G mobile station, the HTTP communication may identify an NAI or MIN of a mobile station as the username. And the user profile store might correlate that NAI or MIN with a particular device type. The device profile store may then list capabilities of that device type.

Additionally, the intermediation system may include or have access to data or logic that indicates what object to generate or select, in view of the capabilities of the requesting client station. For instance, the MARKUP-INSERTION( ) function may define logic for establishing a custom object based on device capabilities.

As an example, consider the U.S. state list discussed above. Depending on the interface capabilities of client station 14, the intermediation system could formulate a list of U.S. states in many different ways. For instance, if the client station enables a user to view a long text list or to scroll through or use a drop down list, the intermediation system might formulate the list in a text box or drop down combo box. And alternatively, if the client station is handheld device equipped with a microbrowser, the intermediation system might formulate the list as an HDML choice-card, with each state recited as a separate choice item. Other examples are also possible.

e. Trapping HTTP Errors.

An exemplary intermediation system can also be used to trap HTTP errors and to provide custom error messages in place of default error messages.

In this regard, an HTTP response normally begins with a status line that includes a response code indicative of whether the HTTP request succeeded. Status codes 200–299 reflect success, while status codes 400–599 reflect errors of various sorts. More particularly, status codes 400–499 reflect a client error, in that the HTTP request contained an error that prevented the server from acting on it successfully. And status codes 500–599 reflect a server error, in that the server failed to act on the request even though the request may have been valid.

For purposes of this discussion, when an HTTP response message recites a success code (such as 200–299 for instance), the HTTP response can be referred to as an "HTTP success response." And when an HTTP response message recites an error code (such as 400–599 for instance), the HTTP response can be referred to as an "HTTP error response."

In general, an HTTP error response can come from the content server to which the client station sent an HTTP request. Or an HTTP error response can come from some other entity, such as a proxy server for instance, which is unable to successfully complete the requested HTTP transaction.

When a browser receives an HTTP error response, the browser will typically detect the error status code recited in the response and then act in some default way to notify the user of the error. For example, the browser might display a dialog box indicating to the user that the browser was unable to connect with the requested site (or, more generally, that the browser was unable to obtain the requested web content). As another example, the browser might display a default web page indicating an error in connecting with the requested site. And as still another example, the browser might respond to an error status code by automatically posting a search request to find related sites and then presenting the user with a web page that lists the search results.

In accordance with the exemplary embodiment, an intermediation system can be arranged to intercept an HTTP error response that is being sent to a client station, and to convert the HTTP error response into an HTTP success response that carries web content indicative of the error. More particularly, the exemplary intermediation system may first detect the fact that an HTTP response recites an error code. In response, rather than sending the HTTP error response to the client station, the intermediation system may then generate an HTTP success response. And in the message body of the HTTP success response, the intermediation system may insert a set of markup language that will cause the browser to display a designated error message to the user. The designated error message may be referred to as an "enhanced error message."

The enhanced error message that the intermediation system inserts in the HTTP success response could take various forms. As one example, it could be customized to reflect an identity of the intermediary in some way and to indicate that an error occurred, so as to show the user that the intermediary is watching out for the user's interest or is otherwise involved in the process. For instance, if the intermediary is the user's access-channel provider (wireless carrier), the error message could depict the access-channel provider's name and/or logo (or other marketing identity) and can then include a display text message stating that the requested site could not be reached (or more generally that the requested web content was unavailable).

As another example, the enhanced error message can propose one or more alternative sites to which the user may navigate. In this regard, the intermediation system could compile a list of alternative sites by invoking a web search engine, or through other means. And the system could then present hyperlinks to those sites as part of the enhanced error message, preceded by an explanation such as "The site you requested is unavailable. The following are some alternatives." Conveniently, when the browser receives the HTTP success response and displays the enhanced error message, the user may then select one of the displayed hyperlinks.

Further, the enhanced error message could be predefined, or the intermediation system can dynamically generate the enhanced error message. In this regard, the intermediation system could maintain in its data storage a set of enhanced error messages, from which the intermediation system can select a desired message to insert into the HTTP success response. Or the intermediation system could apply logic to newly generate an enhanced error message, and/or to modify or complete a predefined message, so as to provide an enhanced error message that is customized to reflect something about the failed request.

Still alternatively or additionally, the enhanced error message in the HTTP success response could be embodied in an interstitial screen. In this regard, when the intermediation system detects an HTTP error response, the intermediation system could engage in interstitial communication with the user in order to handle the error situation. Through the interstitial communication, the intermediation system could take various actions, such as obtaining instructions from the user for proceeding in view of the HTTP error, for instance.

By way of example, when the intermediation system detects an HTTP error response, the intermediation system could serve the user with an interstitial screen that presents an enhanced error message and that asks the user whether the user would like a list of alternative web content. If the user responds affirmatively, such as by clicking a specified link on the interstitial screen, the browser might send then an HTTP request indicating the user's affirmative response. And the intermediation system might then send to the browser an HTTP response that carries a list of alternative web content. In turn, the user may select one of the alternative items listed, and the browser may responsively issue a GET request seeking to load that alternative web content. A variety of other examples are possible as well.

Further, in a situation where requested content is unavailable, the intermediation system could also be programmed to later notify the user when the requested content becomes available. (Through interstitial communication, the system could ask the user if the user wants this service.) For instance, the system could wait until a designated threshold number of users successfully navigate to the content, and the system could then send a message (e.g., SMS, instant message, etc.) to the client station notifying the user that the content has become available.

Note also that this error trapping mechanism could be extended to trapping other types of errors in network communications as well. To generalize, an intermediation system that sits in a network communication path between a server and a client station could receive an error message being sent from the server to the client station, indicating that an error of some sort occurred in responding to a content request from the client station. And the intermediation system can responsively generate and send to the client station an enhanced error message indicative of the error.

For instance, if the client station requests the server to provide real-time media content (such as streaming audio or video for instance) and the server is unable to provide the requested media, the server might send an error message to back to the client station. The intermediation system may detect that error message and responsively provide a real-time media message to the client station, indicating that the requested content is not available. (Assuming the initial request was a SIP INVITE request, for example, and the response was a SIP error message, the intermediation system could responsively convert the SIP error message into a SIP 200 OK message and then itself establish an RTP session with the client station, through which it may play out the enhanced error message to the client station.)

f. Providing Notice of Interstitial Communication

As described by way of example above, an exemplary intermediation system can enhance web communications in many different ways. And often, the process of enhancing web communications may involve engaging in interstitial communication with a user. For example, in order to collect a user's payment for web content, the intermediation system may send an interstitial screen to the user, requesting the user's credit card information or the like, and the user may provide payment information in response. And as another example, the intermediation system may send an interstitial screen to a user asking the user to approve disclosure of user-specific information to a content server, and the user may responsively approve the disclosure.

In accordance with the exemplary embodiment, during interstitial communication with a user, an intermediation system can advantageously notify the user that the user is communicating with the intermediation system, i.e., that the user is engaging in interstitial communication. This notification may be referred to as "interstitial notice."

Provided with interstitial notice, the user can feel comfortable interacting with the intermediation system, particularly if the user knows that the intermediation system is trustworthy. For example, if the intermediation system is located within the user's access channel and is therefore operated by the user's trusted access-channel provider (e.g., wireless carrier), the user can rest assured that interstitial communication with the system is safe and secure.

An exemplary interstitial notice can convey various levels of information. For example, the notice could generally indicate that interstitial communication is underway. And as another example, the notice can provide more specific information about the interstitial communication, such as an identification of the company or other intermediary that owns or operates the intermediation system. As such, the interstitial notice could bear at least one characteristic (e.g., color combination, logo, trademark, trade name, style, etc.) that reflects a marketing identity of the intermediary.

Further, the intermediation system can provide an interstitial notice to a user in various ways. In the exemplary intermediation system described above, for instance, the system can insert the interstitial notice in each interstitial screen that the system sends to client station 14. As such, the system might include, within the markup language that underlies the interstitial screen, a set of markup language that will cause the browser on client station 14 to present the interstitial notice to the user, when interstitial screen is presented to the user.

The markup language could define (cause the browser to present) the interstitial notice as display text, as a graphic, as a media presentation, or in some other way within the body of the interstitial screen. Alternatively or additionally, the markup language could define the interstitial notice with special markup language that will cause the browser to display the interstitial notice within display screen space that is otherwise reserved at the client station. For instance, through use of a suitable tag (that the browser will recognize and to which the browser will respond), the notice could be made to appear in a header or footer area of the container (e.g., window) surrounding or defining the interstitial screen. Alternatively, the markup language could direct the browser (through a suitable plug-in module, for instance) to turn on a light (e.g., LED) or other indicator on or in connection with the client station, which can function to inform the user that trusted interstitial communication is underway.

Alternatively, the process of providing interstitial notice could involve inserting a designated indicator in the HTTP header. Such an indicator could take a predefined form, such as "X-SPCS-TRUSTINDICATOR" for instance. For this mechanism to work, the client station (e.g., browser) would then be arranged to detect that header indication and to responsively present an interstitial notice to the user. The interstitial notice could then again take the form of particular content presented as part of the web content, or in a header, footer or other such area on the display screen, or a light or other indicator otherwise on or in connection with the client station.

Given the open nature of web communications, however, it is possible, that a rogue content server outside the intermediation system could itself put a bogus or counterfeit copy of the interstitial notice into content that it delivers to the client station 14. By doing so, the web server could cause the user to believe that the user is engaging in interstitial communications with the intermediation system when in fact the user is not. In turn, the user might provide the server with confidential information that the user would not otherwise disclose.

To help avoid this situation, an exemplary intermediation system will be further arranged to detect and delete such bogus interstitial notice in HTTP responses before sending the responses along to client station 14.

Thus, in operation, an intermediation system may have a predefined interstitial notice that it includes within each interstitial screen that it sends to a client station. And that predefined interstitial notice will be defined by a particular set of markup language (or a particular indicator). The markup-pattern table on the intermediation platform 60 may then include a record that recites the interstitial notice markup language and that points to a NOTICE-CHECK( ) function. When processor 68 detects the markup language (or indicator) in an incoming HTTP response, the processor may therefore call the NOTICE-CHECK( ) function.

In executing the NOTICE-CHECK( ) function, the processor 68 may determine whether the incoming HTTP response came from within the intermediation system, such as from interstitial server 62. If so, then the processor may conclude that the interstitial notice is valid and may send the HTTP response along its way to the client station 14. As a result, the browser running on the client station 14 will display the interstitial notice as part of the web page defined by the HTTP response (or otherwise as noted above for instance).

Alternatively, if the processor determines that the HTTP response came from somewhere outside of the intermediation system (i.e., that the response was received by the intermediation system), then the processor may conclude that the interstitial notice is invalid. Therefore, the processor may then strip (e.g., delete, comment out or otherwise render non-interpretable) the interstitial notice markup language (or indicator) from the HTTP response. And the processor may then send the modified HTTP response along to the client station 14. As a result, the browser will not display the predefined interstitial notice as part of the web page defined by the HTTP response (or otherwise, as described above). (Further, through HTTP modification, through interstitial communication, or by other messaging to the client station, the processor may notify the user that a wrongful attempt was made to trick the user into believing that interstitial communication was underway.)

The logic that the processor executes to detect the predefined interstitial notice in an HTTP response received by the intermediation system, and to strip the interstitial notice from the HTTP response before sending the response along the HTTP communication path to the client station, can be referred to generally as "notice-management logic."

4. Dynamic Variance of Intermediation Functions

The arrangement described above largely assumes that the intermediation system includes or has access to a set of logic, such as program instructions and reference data, that defines various intermediation functions. As described above, the intermediation logic may define intermediation triggers and intermediation actions. When the intermediation system encounters an intermediation trigger with respect to an HTTP communication that is passing along an HTTP communication path, the intermediation system may take a designated intermediation action in response.

In practice, the intermediation system may be provisioned with the intermediation logic in advance, i.e., before the intermediation system receives an HTTP communication to which the logic will apply. Thus, for instance, the URI-pattern table in the exemplary intermediation system may be set up in advance to include a record that specifies the URI pattern "www.newsmagazine.com/article0001.htm" and that points to the INTERSTITIAL-BILLING( ) function, and the INTERSTITIAL-BILLING( ) function may also be set up in advance. Thereafter, the system may then detect an HTTP request that designates that particular URI pattern, and the system may responsively call the INTERSTITIAL-BILLING( ) function so as to invoke an interstitial charge advice system.

A content provider can work with the intermediary so as to set up desired intermediation logic in the system. For instance, if a content provider agrees to have the intermediary charge users a certain price for access to a web page, the content provider and/or intermediary could set a record in the URI-pattern table reflecting the URI of that web page (i.e., an intermediation trigger) as well as the amount to be charged (i.e., an intermediation action). Other examples of advance provisioning are also possible.

Although advance static provisioning may work well in most cases, it may occasionally be desirable to make exceptions or changes to the intermediation logic with respect to certain HTTP communications. An exemplary embodiment of the present invention makes this possible by providing a dynamic variance process. According to this process, an intermediation system will detect an intermediation-variance instruction within an HTTP message and will responsively make a change or exception to its set intermediation logic. The intermediation system will then apply the newly varied logic with respect to the very HTTP message that carried the variance instruction.

Thus, in general, an intermediation system may have a default state of operation and a variant state of operation. The default state of operation is defined by default intermediation logic, provisioned in advance. And the variant state of operation is defined by variant logic provisioned dynamically pursuant to an intermediation-variance instruction.

In the exemplary embodiment, the change or exception that the intermediation system makes to its default set of intermediation logic in response to an intermediation-variance instruction can be an addition, modification or removal of at least one intermediation trigger and/or at least one intermediation action.

By way of example, for a given HTTP communication (e.g., a given URI-pattern, a given markup-pattern, etc.), the default state of operation might be to take no intermediation action (e.g., because no associated intermediation trigger exists), and the variant state of operation might be to take some intermediation action (e.g., because an associated trigger exists). As another example, the default state might be to not take a particular intermediation action, while the variant state might be to take that particular intermediation action. And as still another example, the default state might be to take a certain intermediation action (e.g., as indicated by a URI-pattern table or markup-pattern table), while the variant state might be to take no intermediation action or to take some other action instead. Other examples are possible as well.

In the exemplary embodiment, the intermediation-variance instruction will come from the content server 18, within the HTTP response message provided by the content server. As such, the intermediation-variance instruction could itself be markup language carried in the message body of the HTTP response, as comment language that would normally not be interpreted by the browser and/or as language that would normally be interpreted by the browser, and whether contiguous or non-contiguous.

In order to facilitate the intermediation-variance function, the markup-pattern table could list one or more markup language elements that define intermediation-variance instructions. For example, the markup tag <INT-VAR> might be used to introduce an intermediation-variance instruction, and certain parameters could then follow that tag in order to specify the desired variance.

Each such record in the markup-pattern table could point to a INTERMEDIATION-VARIANCE( ) function in the handler logic modules 80. Thus, when processor 68 detects a variance instruction in an HTTP response, the processor may then call the INTERMEDIATION-VARIANCE( ) function and, by executing the function, may effect the variance.

Alternatively, rather than providing the variance instruction in the message body of the HTTP response, the content server 18 could provide the variance instruction in a header field of the HTTP response. In that event, the intermediation platform 60 would be programmed to detect the variance instruction in the header field and to respond accordingly.

Still alternatively, the intermediation-variance instruction can come from the client station 14. By way of example, the variance instruction can be set forth as a query parameter within a request-URI. And, in turn, the intermediation platform 60 would be programmed to detect the variance instruction in the HTTP request, and to responsively switch to a variant state of operation with respect to the HTTP request.

The intermediation system can switch from default state to variant state in many different ways. For example, once processor 68 determines that variant operation is required, the processor can then immediately take the variant action. As another example, once the processor determines that variant operation is required, the processor can store in memory an indication of the variance so that, when it later determines whether and what intermediation action to take, it may do so pursuant to the variance.

Similarly, as another example, once the processor determines that variant operation is required, the processor may change the logic 74 and/or reference data 82 in some manner so as to effect the variance from that point forward. For instance, the processor could add, change or delete a record in the markup-pattern table. In this regard, the processor might change the action associated with particular markup language in the markup-pattern table. That way, when the processor thereafter detects that markup language, the processor may take the newly designated action. Other examples are possible as well.

In the exemplary embodiment, the intermediation platform 60 will preferably look for an intermediation-variance instruction in an HTTP message before looking for other intermediation triggers with respect to the HTTP message. That way, if variance is required, the platform can effect the variance and then employ the variance, if appropriate, when determining whether and what intermediation action to take with respect to the HTTP message.

Further, the intermediation system will preferably strip (delete and/or comment out) the variance instruction before sending the HTTP message on to its destination, so that the recipient will not know that any variance occurred. Alternatively, the intermediation system could leave the variance instruction in the message.

Many examples of this variance process are possible. As one example, an intermediation-variance instruction can cause the intermediation system to insert into an HTTP response an explanatory object other that that which the system would normally insert. Alternatively, the variance instruction could cause the system to insert the default explanatory object in some variant manner, or to not insert it at all.

For instance, in the default state, the intermediation system might list a cost of $2.50 for URI-pattern "www.newsmagazine.com/article0001.htm". Thus, when the system detects a hyperlink to that pattern in an HTTP response, the system may normally embellish the hyperlink with a parenthetical indication of that cost.

However, assume that the HTTP response also includes an intermediation-variance instruction that changes the cost to $2.25. An example of such a variance instruction might be:

<INT-VAR
MARKUP="www.newsmagazine.com/article0001.htm"
OLDCOST="$2.50"
NEWCOST="$2.25"></INT-VAR>

When the processor 68 detects that variance instruction in the HTTP response, the processor may store in memory an indication of variance. And thereafter, when the processor seeks to embellish the hyperlink with a cost pursuant to the ADDCOST( ) function, the processor may apply the variance so as to embellish the hyperlink with a parenthetical indication of $2.25, rather than $2.50. (Note that this could be done on a per-user basis, so as to allow for variance of pricing between users for a given set of content.)

Alternatively, possibly depending on the particular variance instruction, the processor might make the variance permanent by changing the URI-pattern record to reflect a cost of $2.25 rather than $2.50.

As another example, intermediation variance could be used to introduce interstitial billing during communication of an HTTP response from a content server to a client station. For instance, when a user requests content at a particular URI, the intermediation system might not normally be arranged to perform interstitial billing upon detection of the HTTP request. However, when the content server sends an HTTP response providing the requested content, the content server may include within the HTTP response an intermediation-variance instruction, directing the intermediation system to perform interstitial billing before sending the HTTP response on its way to the client station.

In this regard, the response trigger data 86 might list the URI and might then point to the INTERSTITIAL-BILLING( ) function. Thus, when the intermediation system detects the intermediation-variance instruction in an HTTP response, the system may pause transmission of the HTTP response and may invoke the interstitial billing function. After collecting the user's payment or agreement to pay or be billed, the intermediation system may then send the HTTP response to the client station.

Other examples are possible as well.

5. URI Re-Writing

In order to maintain control over HTTP communications, an exemplary intermediation platform can also be arranged to rewrite hyperlinks in content that is being delivered to a client station, so as to have the hyperlinks point first to the intermediation platform. For example, assume that the intermediation platform receives an HTTP response that is being delivered to a client station (or first to a web portal) and that markup language carried by the HTTP response includes a link to the URL "www.newsmagazine.com". The intermediation platform might rewrite that URL in the link to read "redirect.spcs.com/www.newsmagazine.com", where "redirect.spcs.com" is a URL of the intermediation platform. That way, whenever a user invokes that hyperlink, the user's browser would send an HTTP request to the intermediation platform. In turn, the intermediation platform could then act on the request and optionally forward it on to the "www.newsmagazine.com" site.

6. Conclusion

An exemplary embodiment of the present invention has been described above. Those skilled in the art will understand, however, that changes and modifications may be made to this embodiment without departing from the true scope and spirit of the present invention, which is defined by the claims.

For instance, although the foregoing description focuses on HTTP signaling, many of the aspects described can be extended to apply with other signaling, such as SIP, RTP, or the like. Other exemplary variations are possible as well.

We claim:

1. A method comprising carrying out the following functions within an intermediation system disposed within an HTTP communication path between a content server and a client station:
   engaging in interstitial communication with the client station;
   during interstitial communication, sending to the client station one or more interstitial screens, each such interstitial screen including a predefined interstitial notice;
   detecting the predefined interstitial notice in an HTTP response message received by the intermediation system;
   determining that the predefined interstitial notice detected in the HTTP response message is invalid;
   in response to a determination that the predefined interstitial notice detected in the HTTP response message is invalid, stripping the predefined interstitial notice from the HTTP response message so as to establish a modified HTTP response message; and
   sending the modified HTTP response message along the HTTP communication path to the client station.

2. The method of claim 1, wherein the intermediation system is operated by an intermediary, and wherein the interstitial notice reflects an identity of the intermediary.

3. The method of claim 1, wherein the HTTP communication path extends via an access channel to the client station, and wherein the intermediation system is disposed within the access channel.

4. The method of claim 1, wherein the client station is a mobile station and the access-channel comprises a wireless link to the mobile station.

5. The method of claim 1, wherein the predefined interstitial notice has a form selected from the group consisting of (i) display text, (ii) graphic and (iii) media presentation.

6. The method of claim 1, further comprising:
   sending a message to the client station indicating that a wrongful attempt has been made to insert the predefined interstitial notice into the HTTP response message.

7. An intermediation system disposed within an HTTP communication path between a client station and a content server, the intermediation system comprising:
   interstitial-communication logic for engaging in interstitial communication with the client station, wherein the interstitial-communication logic sends to the client station one or more interstitial screens, each such interstitial screen including a predefined interstitial notice; and
   notice-management logic for (i) detecting the predefined interstitial notice in an HTTP response message received by the intermediation system, (ii) determining that the predefined interstitial notice detected in the HTTP response message is invalid, and (iii) in response to a determination that the predefined interstitial notice detected in the HTTP response message is invalid, stripping the predefined interstitial notice from the HTTP response message before sending the HTTP response message along to the client station,
   whereby the client station receives the HTTP response message with the predefined interstitial notice stripped from the HTTP response message.

8. The intermediation system of claim 7, wherein:
   the interstitial-communication logic comprises machine language instructions executable by a processor; and
   the notice-management logic comprises machine language instructions executable by a processor.

9. The intermediation system of claim 7, wherein the intermediation system is operated by an intermediary, and wherein the interstitial notice reflects an identity of the intermediary.

10. The intermediation system of claim 7, wherein the HTTP communication path extends via an access channel to the client station, and wherein the intermediation system is disposed within the access channel.

11. The intermediation system of claim 7, wherein the client station is a mobile station and the access-channel comprises a wireless link to the mobile station.

12. The intermediation system of claim 7, further comprising:
   a network interface for receiving and sending communications along the HTTP communication path, wherein the interstitial-communication logic sends the one or more interstitial screens to the client station via the network interface.

13. The intermediation system of claim 7,
   wherein the interstitial-communication logic sends each interstitial screen to the client station as markup language in an HTTP response, and
   wherein the markup language defines the predefined interstitial notice in a manner such that a browser at the client station will present the interstitial notice to a user of the client station when presenting the interstitial screen to the user.

14. The intermediation system of claim 13, wherein the markup language defines the predefined interstitial notice in a form selected from the group consisting of (i) display text, (ii) graphic and (iii) media presentation.

15. The intermediation system of claim 13, wherein the client station includes reserved display screen space, and wherein the markup language defines the predefined interstitial notice to be displayed in the reserved display screen space,
   whereby the client station displays the interstitial notice in the reserved display screen space.

* * * * *